(12) United States Patent
Stanners et al.

(10) Patent No.: US 11,740,600 B2
(45) Date of Patent: Aug. 29, 2023

(54) COMPUTERIZED METHOD, PROCESSING STRUCTURE AND SERVER FOR CONTROLLING A TARGET-MOTION DEVICE BASED ON SOURCE-MOTION OBJECT

(71) Applicant: VRX Ventures Ltd., Sidney (CA)

(72) Inventors: Robert Stanners, North Saanich (CA); Alexander Stanners, North Saanich (CA)

(73) Assignee: VRX Ventures Ltd., Sidney (CA)

(*) Notice: Subject to any disclaimer, the term of this patent is extended or adjusted under 35 U.S.C. 154(b) by 0 days.

(21) Appl. No.: 17/639,832

(22) PCT Filed: Aug. 28, 2020

(86) PCT No.: PCT/CA2020/051181
§ 371 (c)(1),
(2) Date: Mar. 2, 2022

(87) PCT Pub. No.: WO2021/035362
PCT Pub. Date: Mar. 4, 2021

(65) Prior Publication Data
US 2022/0326669 A1    Oct. 13, 2022

Related U.S. Application Data

(60) Provisional application No. 62/894,486, filed on Aug. 30, 2019.

(51) Int. Cl.
*G05B 15/02* (2006.01)
*G06T 7/20* (2017.01)
(Continued)

(52) U.S. Cl.
CPC ............ *G05B 15/02* (2013.01); *G06T 7/20* (2013.01); *G08G 1/0965* (2013.01); *G08G 1/0968* (2013.01); *G08G 1/123* (2013.01)

(58) Field of Classification Search
CPC ...... G06T 7/20; G08G 1/0965; G08G 1/0968; G08G 1/123; G05B 15/02; A63F 13/245; A63F 13/35; A63F 13/803; A63G 31/00
See application file for complete search history.

(56) References Cited

U.S. PATENT DOCUMENTS

| | | |
|---|---|---|
| 7,172,722 B2 | 2/2007 | Wegstein et al. |
| 9,270,940 B1 | 2/2016 | Aravkin et al. |
| (Continued) | | |

FOREIGN PATENT DOCUMENTS

| | | |
|---|---|---|
| CA | 3030125 A1 | 7/2019 |

OTHER PUBLICATIONS

ISA/CA—Canadian Intellectual Property Office—International Search Report, dated Nov. 12, 2020—PCT/CA2020/051181.
(Continued)

*Primary Examiner* — Ramesh B Patel
(74) *Attorney, Agent, or Firm* — Gowling WLG (Canada) LLP

(57) ABSTRACT

A computerized method for controlling a target-motion device based on motion of a first source-motion object. The method has the steps of: capturing motion-related data at the first source-motion object, the motion-related data representing the mootion of the first source-motion object; processing, at the first source-motion object, the motion-related data by converting captured motion-related data from a first format to a second format; transmitting the processed motion-related data to a server; forwarding, by the server, the processed motion-related data to the target-motion device; and moving at least a portion of the target-motion device based on at least the processed motion-related data.

20 Claims, 8 Drawing Sheets

(51) Int. Cl.
G08G 1/0965 (2006.01)
G08G 1/0968 (2006.01)
G08G 1/123 (2006.01)

(56) References Cited

U.S. PATENT DOCUMENTS

| | | | |
|---|---|---|---|
| 10,032,280 B2* | 7/2018 | Piekniewski | G06T 3/00 |
| 2006/0064211 A1 | 3/2006 | Johansen et al. | |
| 2010/0131080 A1* | 5/2010 | Brown | G10L 15/22 |
| | | | 700/17 |
| 2016/0234184 A1* | 8/2016 | Liu | G06F 16/433 |
| 2016/0292509 A1* | 10/2016 | Kaps | A63F 13/212 |
| 2017/0164145 A1* | 6/2017 | Lipman | H04W 4/021 |
| 2017/0262697 A1* | 9/2017 | Kaps | G11B 27/022 |
| 2018/0063504 A1* | 3/2018 | Haines | H04N 7/183 |
| 2018/0114364 A1* | 4/2018 | McPhee | A63F 13/211 |
| 2018/0196523 A1* | 7/2018 | Arana | A63F 13/212 |
| 2018/0213166 A1* | 7/2018 | Kim | H04N 5/23293 |
| 2020/0020158 A1* | 1/2020 | McPhee | G06F 3/0346 |
| 2022/0180651 A1* | 6/2022 | Strong | H04N 19/46 |

OTHER PUBLICATIONS

ISA/CA—Canadian Intellectual Property Office—Written Opinion of the International Searching Authority, dated Nov. 12, 2020—PCT/CA2020/051181.
IPEA/CA—Canadian Intellectual Property Office—International Preliminary Report on Patentability (Chapter II of the PCT), dated Dec. 1, 2021—PCT/CA2020/051181.

* cited by examiner

COMPUTERIZED METHOD, PROCESSING STRUCTURE AND SERVER FOR CONTROLLING A TARGET-MOTION DEVICE BASED ON SOURCE-MOTION OBJECT

CROSS-REFERENCE TO RELATED APPLICATIONS

This application claims the benefit of U.S. Provisional Patent Application Ser. No. 62/894,486, filed Aug. 30, 2019, the content of which is incorporated herein by reference in its entirety.

FIELD OF THE DISCLOSURE

This invention relates generally to motion device and more particularly, to systems and methods for mapping motion-related parameters of remote, source-motion objects such as vehicles, animals, human being, and the like moving at remote locations for replaying the motion thereof on one or more target motion devices.

BACKGROUND

Racing has captured the interest of both gaming and live sports since inception. Gaming simulations and physical events converge in the world of electronic sports ("e-sports"). This provides an opportunity for new method and apparatus to evolve to bridge the gap between simulations based on static content sources and live tactile events.

SUMMARY

A method and apparatus of a system that captures and transmits motion data from a source-motion object to a target-motion device is described. In an exemplary embodiment, a device receives a request for the motion-related data from the target-motion device and captures the motion data from the device. Furthermore, the device processes the motion data by converting captured motion data from a first format to a second format. The device additionally transmits the processed motion data to a broker, where the broker forwards the processed motion data to the target-motion device and the target-motion device replays the processed motion data to move the target-motion device according to at least the processed motion data.

In various embodiments, the source-motion object may be a vehicle, an animal or livestock, a human, or the like, moving at a remote location.

In a further embodiment, a device replays motion data on a target-motion device captured on a source-motion object. In one embodiment, the device requests a set of available source-motion objects, wherein each of the set of source-motion objects providing motion data that can be replayed on the device. Furthermore, the device receives the set of available source-motion objects and selects one of the set of available source-motion objects. In addition, the device receives the motion data from the one of the selected available source-motion objects via a broker. The device further processes the motion data. The device additionally, for each unit of the processed motion data, sends the unit of the processed motion data to an actuator component coupled to the device, wherein the actuator component processes the unit of motion data causing motion for a user component of the device.

Other methods and apparatuses are also described.

According to one aspect of this disclosure, there is provided a computerized method for controlling a target-motion device based on motion of a first source-motion object. The method comprises: capturing motion-related data at the first source-motion object, the motion-related data representing the motion of the first source-motion object; processing, at the first source-motion object, the motion-related data by converting captured motion-related data from a first format to a second format; transmitting the processed motion-related data to a server; forwarding, by the server, the processed motion-related data to the target-motion device; and moving at least a portion of the target-motion device based on at least the processed motion-related data.

In some embodiments, the computerized method further comprises receiving, on the first source-motion object, a request for the motion-related data sent from the target-motion device.

In some embodiments, said processing, at the first source-motion object, the motion-related data comprises: processing, at the first source-motion object, the motion-related data by converting captured motion-related data from a first format to a text-based format.

In some embodiments, the computerized method further comprises publishing the processed motion-related data on the server.

In some embodiments, the computerized method further comprises: maintaining a first channel one the server for the first source-motion object; and publishing the processed motion-related data on the first channel on the server.

In some embodiments, the computerized method further comprises: receiving a request from the target-motion device for subscribing the first channel; if the target-motion device is connected to a second channel of a second source-motion object, disconnecting the target-motion device from the second channel; and connecting the target-motion device to the first channel. In some embodiments, the computerized method further comprises organizing the processed motion-related data in a hierarchical structure having a plurality of topics.

In some embodiments, the computerized method further comprises scaling at least a portion of the processed motion-related data.

In some embodiments, the computerized method further comprises adjusting a coordinate system of at least a portion of the processed motion-related data for adapting to the target-motion device.

In some embodiments, the computerized method further comprises storing at least a portion of the processed motion-related data.

In some embodiments, the computerized method further comprises: capturing audio/video data related to the first source-motion object; transmitting the audio/visual data to the target-motion device via the server; and presenting the audio/visual data on the target-motion device.

In some embodiments, the computerized method further comprises temporally synchronizing, on the target-motion device, the audio/visual data with the processed motion-related data.

In some embodiments, said capturing the motion-related data further comprises: capturing the motion-related data of the first source-motion object in x, y, and z planes.

In some embodiments, said capturing the motion-related data further comprises: capturing the motion-related data from at least one sensor coupled to the first source-motion object, wherein the motion-related data comprises at least one of a linear velocity, an acceleration, a vibration, thermal data, an altitude, gyroscopic data, and battery voltage.

In some embodiments, the first source-motion object is one of a vehicle movable on the ground, a vehicle movable on or in water, a vehicle movable in the air, and a vehicle movable in the space.

In some embodiments, the first source-motion object is one of a race car, an emergency vehicle, and a training vehicle.

In some embodiments, the target-motion device comprises a user compartment coupled to a set of one or more actuators; and said moving the at least portion of the target-motion device based on at least the processed motion-related data comprises: controlling the one or more actuators based on at least the processed motion-related data for moving the user compartment.

In some embodiments, said transmitting the processed motion-related data to the server comprises: transmitting the processed motion-related data to the server using a Message Queueing Telemetry Transport protocol.

In some embodiments, said capturing the motion-related data at the first source-motion object comprises: capturing the motion-related data using a sensor on a controlling component of the first source-motion object for generating a motion event associated with the controlling component.

In some embodiments, the controlling component is at least one of a steering wheel, accelerator pedal, brake pedal, and a joystick.

In some embodiments, the computerized method further comprises: receiving one or more instructions from the target-motion device; transmitting the one or more instructions to the first source-motion object; and controlling the first source-motion object based on the one or more instructions.

In some embodiments, said transmitting the one or more instructions to the first source-motion object comprises: transmitting the one or more instructions to the first source-motion object via the server.

According to one aspect of this disclosure, there is provided a computerized method for controlling a target-motion device based on motion of a first source-motion object. The method comprises: receiving motion-related data from a server, the motion-related data representing the motion of the first source-motion object; processing the motion-related data by the target-motion device; and for each unit of the processed motion-related data, controlling an actuator component coupled to the target-motion device based on the unit of the processed motion-related data for causing motion of at least a portion of the target-motion device.

In some embodiments, the computerized method further comprises sending a request for the motion-related data of the first source-motion object.

In some embodiments, said receiving the motion-related data from the first source-motion object via the server comprises: receiving the motion-related data in a text-based format from the server.

In some embodiments, said receiving the motion-related data from the first source-motion object via the server comprises: receiving the motion-related data from a first channel on the server.

In some embodiments, the computerized method further comprises: sending a request for available source-motion objects; receiving a list of the available source-motion objects, said list of the available source-motion objects comprising the first source-motion object; selecting the first source-motion object from the list of the available source-motion objects; if the target-motion device is connected to a second channel of a second source-motion object, disconnecting the target-motion device from the second channel; and connecting the target-motion device to the first channel on the server.

In some embodiments, the received motion-related data is organized in a hierarchical structure having a plurality of topics.

In some embodiments, the computerized method further comprises scaling at least a portion of the received motion-related data.

In some embodiments, the computerized method further comprises adjusting a coordinate system of at least a portion of the processed motion-related data for adapting to the target-motion device.

In some embodiments, the computerized method further comprises: receiving the audio/visual data associated with the first source-motion object; and presenting the audio/visual data on the target-motion device.

In some embodiments, the computerized method further comprises temporally synchronizing, on the target-motion device, the audio/visual data with the received motion-related data.

In some embodiments, the received motion-related data represents the motion of the first source-motion object in x, y, and z planes.

In some embodiments, the received motion-related data comprises at least one of a linear velocity, an acceleration, a vibration, thermal data, an altitude, gyroscopic data, and battery voltage.

In some embodiments, the first source-motion object is one of a vehicle movable on the ground, a vehicle movable on or in water, a vehicle movable in the air, and a vehicle movable in the space.

In some embodiments, the first source-motion object is one of a race car, an emergency vehicle, and a training vehicle.

In some embodiments, the actuator component comprises a set of one or more actuators coupled a user compartment; and said, for each unit of the processed motion-related data, controlling the actuator component coupled to the target-motion device based on the unit of the processed motion-related data for causing the motion of the at least portion of the target-motion device comprises: for each unit of the processed motion-related data, controlling the one or more actuators based on the unit of the processed motion-related data for moving the user compartment.

In some embodiments, the motion-related data comprising data captured by a sensor on a controlling component of the first source-motion object representing a motion event associated with the controlling component.

In some embodiments, the controlling component is at least one of a steering wheel, accelerator pedal, brake pedal, and a joystick.

In some embodiments, the computerized method further comprises: receiving one or more instructions from the target-motion device; and transmitting the one or more instructions to the server for controlling the first source-motion object.

According to one aspect of this disclosure, there is provided one or more non-transitory computer-readable storage devices comprising computer-executable instructions for controlling a target-motion device based on motion of a first source-motion object. The instructions, when executed, cause a processing structure to perform actions comprising: capturing motion-related data at the first source-motion object, the motion-related data representing the motion of the first source-motion object; processing, at the first source-motion object, the motion-related data by converting captured motion-related data from a first format to a second format; transmitting the processed motion-related data to a server; forwarding, by the server, the processed motion-related data to the target-motion device; and moving at least a portion of the target-motion device based on at least the processed motion-related data.

In some embodiments, the instructions, when executed, cause the processing structure to perform further actions comprising: receiving, on the first source-motion object, a request for the motion-related data sent from the target-motion device.

In some embodiments, said processing, at the first source-motion object, the motion-related data comprises: processing, at the first source-motion object, the motion-related data by converting captured motion-related data from a first format to a text-based format.

In some embodiments, the instructions, when executed, cause the processing structure to perform further actions comprising: publishing the processed motion-related data on the server.

In some embodiments, the instructions, when executed, cause the processing structure to perform further actions comprising: maintaining a first channel one the server for the first source-motion object; and publishing the processed motion-related data on the first channel on the server.

In some embodiments, the instructions, when executed, cause the processing structure to perform further actions comprising: receiving a request from the target-motion device for subscribing the first channel; if the target-motion device is connected to a second channel of a second source-motion object, disconnecting the target-motion device from the second channel;

and connecting the target-motion device to the first channel.

In some embodiments, the instructions, when executed, cause the processing structure to perform further actions comprising: organizing the processed motion-related data in a hierarchical structure having a plurality of topics.

In some embodiments, the instructions, when executed, cause the processing structure to perform further actions comprising: scaling at least a portion of the processed motion-related data.

In some embodiments, the instructions, when executed, cause the processing structure to perform further actions comprising: adjusting a coordinate system of at least a portion of the processed motion-related data for adapting to the target-motion device.

In some embodiments, the instructions, when executed, cause the processing structure to perform further actions comprising: storing at least a portion of the processed motion-related data.

In some embodiments, the instructions, when executed, cause the processing structure to perform further actions comprising: capturing audio/video data related to the first source-motion object; transmitting the audio/visual data to the target-motion device via the server; and presenting the audio/visual data on the target-motion device.

In some embodiments, the instructions, when executed, cause the processing structure to perform further actions comprising: temporally synchronizing, on the target-motion device, the audio/visual data with the processed motion-related data.

In some embodiments, said capturing the motion-related data further comprises: capturing the motion-related data of the first source-motion object in x, y, and z planes.

In some embodiments, said capturing the motion-related data further comprises: capturing the motion-related data from at least one sensor coupled to the first source-motion object, wherein the motion-related data comprises at least one of a linear velocity, an acceleration, a vibration, thermal data, an altitude, gyroscopic data, and battery voltage.

In some embodiments, the first source-motion object is one of a vehicle movable on the ground, a vehicle movable on or in water, a vehicle movable in the air, and a vehicle movable in the space.

In some embodiments, the first source-motion object is one of a race car, an emergency vehicle, and a training vehicle.

In some embodiments, the target-motion device comprises a user compartment coupled to a set of one or more actuators; and said moving the at least portion of the target-motion device based on at least the processed motion-related data comprises: controlling the one or more actuators based on at least the processed motion-related data for moving the user compartment.

In some embodiments, said transmitting the processed motion-related data to the server comprises: transmitting the processed motion-related data to the server using a Message Queueing Telemetry Transport protocol.

In some embodiments, said capturing the motion-related data at the first source-motion object comprises: capturing the motion-related data using a sensor on a controlling component of the first source-motion object for generating a motion event associated with the controlling component.

In some embodiments, the controlling component is at least one of a steering wheel, accelerator pedal, brake pedal, and a joystick.

In some embodiments, the instructions, when executed, cause the processing structure to perform further actions comprising: receiving one or more instructions from the target-motion device; transmitting the one or more instructions to the first source-motion object; and controlling the first source-motion object based on the one or more instructions.

In some embodiments, said transmitting the one or more instructions to the first source-motion object comprises: transmitting the one or more instructions to the first source-motion object via the server.

According to one aspect of this disclosure, there is provided one or more non-transitory computer-readable storage devices comprising computer-executable instructions for controlling a target-motion device based on motion of a first source-motion object. The instructions, when executed, cause a processing structure to perform actions comprising: receiving motion-related data from a server, the motion-related data representing the motion of the first source-motion object; processing the motion-related data by the target-motion device; and for each unit of the processed motion-related data, controlling an actuator component coupled to the target-motion device based on the unit of the processed motion-related data for causing motion of at least a portion of the target-motion device.

In some embodiments, the instructions, when executed, cause the processing structure to perform further actions comprising: sending a request for the motion-related data of the first source-motion object.

In some embodiments, said receiving the motion-related data from the first source-motion object via the server comprises: receiving the motion-related data in a text-based format from the server.

In some embodiments, said receiving the motion-related data from the first source-motion object via the server comprises: receiving the motion-related data from a first channel on the server.

In some embodiments, the instructions, when executed, cause the processing structure to perform further actions comprising: sending a request for available source-motion objects; receiving a list of the available source-motion objects, said list of the available source-motion objects comprising the first source-motion object; selecting the first source-motion object from the list of the available source-motion objects; if the target-motion device is connected to a second channel of a second source-motion object, disconnecting the target-motion device from the second channel; and connecting the target-motion device to the first channel on the server. In some embodiments, the received motion-related data is organized in a hierarchical structure having a plurality of topics.

In some embodiments, the instructions, when executed, cause the processing structure to perform further actions comprising: scaling at least a portion of the received motion-related data.

In some embodiments, the instructions, when executed, cause the processing structure to perform further actions comprising: adjusting a coordinate system of at least a portion of the processed motion-related data for adapting to the target-motion device.

In some embodiments, the instructions, when executed, cause the processing structure to perform further actions comprising: receiving the audio/visual data associated with the first source-motion object; and presenting the audio/visual data on the target-motion device.

In some embodiments, the instructions, when executed, cause the processing structure to perform further actions comprising: temporally synchronizing, on the target-motion device, the audio/visual data with the received motion-related data.

In some embodiments, the received motion-related data represents the motion of the first source-motion object in x, y, and z planes.

In some embodiments, the received motion-related data comprises at least one of a linear velocity, an acceleration, a vibration, thermal data, an altitude, gyroscopic data, and battery voltage.

In some embodiments, the first source-motion object is one of a vehicle movable on the ground, a vehicle movable on or in water, a vehicle movable in the air, and a vehicle movable in the space.

In some embodiments, the first source-motion object is one of a race car, an emergency vehicle, and a training vehicle.

In some embodiments, the actuator component comprises a set of one or more actuators coupled a user compartment; and said, for each unit of the processed motion-related data, controlling the actuator component coupled to the target-motion device based on the unit of the processed motion-related data for causing the motion of the at least portion of the target-motion device comprises: for each unit of the processed motion-related data, controlling the one or more actuators based on the unit of the processed motion-related data for moving the user compartment. In some embodiments, the motion-related data comprising data captured by a sensor on a controlling component of the first source-motion object representing a motion event associated with the controlling component.

In some embodiments, the controlling component is at least one of a steering wheel, accelerator pedal, brake pedal, and a joystick.

In some embodiments, the instructions, when executed, cause the processing structure to perform further actions comprising: receiving one or more instructions from the target-motion device; and transmitting the one or more instructions to the server for controlling the first source-motion object.

According to one aspect of this disclosure, there is provided a server for controlling a target-motion device based on motion of a first source-motion object. The server comprises: one or more communication components; one or more storage components; and one or more processors coupled to the one or more communication components and the one or more storage components for: receiving motion-related data from the first source-motion object via a network, the motion-related data representing the motion of the first source-motion object; and forwarding the processed motion-related data to the target-motion device for moving at least a portion thereof based on at least the motion-related data.

In some embodiments, the motion-related data is in a text-based format converted from data captured at the first source-motion object.

In some embodiments, the one or more processors are further adapted for publishing the motion-related data.

In some embodiments, the one or more processors are further adapted for: maintaining a first channel for the first source-motion object; and publishing the processed motion-related data on the first channel.

In some embodiments, the one or more processors are further adapted for: receiving a request from the target-motion device for subscribing the first channel; if the target-motion device is connected to a second channel of a second source-motion object, disconnecting the target-motion device from the second channel; and connecting the target-motion device to the first channel.

In some embodiments, the one or more processors are further adapted for organizing the motion-related data in a hierarchical structure having a plurality of topics.

In some embodiments, the one or more processors are further adapted for scaling at least a portion of the motion-related data.

In some embodiments, the one or more processors are further adapted for adjusting a coordinate system of at least a portion of the processed motion-related data for adapting to the target-motion device.

In some embodiments, the one or more processors are further adapted for storing at least a portion of the processed motion-related data.

In some embodiments, the one or more processors are further adapted for: receiving audio/video data related to the first source-motion object; and transmitting the audio/visual data to the target-motion device for presenting the audio/visual data on the target-motion device.

In some embodiments, said the motion-related data comprises data of the first source-motion object in x, y, and z planes.

In some embodiments, the motion-related data further comprises at least one of a linear velocity, an acceleration, a vibration, thermal data, an altitude, gyroscopic data, and battery voltage.

In some embodiments, the first source-motion object is one of a vehicle movable on the ground, a vehicle movable on or in water, a vehicle movable in the air, and a vehicle movable in the space.

In some embodiments, the first source-motion object is one of a race car, an emergency vehicle, and a training vehicle.

In some embodiments, said receiving the motion-related data from the first source-motion object via the network comprises: receiving the motion-related data from the first source-motion object via the network using a Message Queueing Telemetry Transport protocol.

In some embodiments, the motion-related data comprises data captured by a sensor on a controlling component of the first source-motion object.

In some embodiments, the controlling component is at least one of a steering wheel, accelerator pedal, brake pedal, and a joystick.

In some embodiments, the one or more processors are further adapted for: receiving one or more instructions from the target-motion device; and transmitting the one or more instructions to the first source-motion object for controlling the first source-motion object based on the one or more instructions.

According to one aspect of this disclosure, there is provided a target-motion device controllable based on motion of a first source-motion object. The target-motion device comprises:

an actuator component; one or more communication components; one or more storage components; and one or more processors coupled to the one or more communication components, the one or more storage components, and the actuator component for: receiving motion-related data from a server, the motion-related data representing the motion of the first source-motion object; processing the motion-related data by the target-motion device; and for each unit of the processed motion-related data, controlling the actuator component based on the unit of the processed motion-related data for causing motion of at least a portion of the target-motion device.

In some embodiments, the one or more processors are further adapted for sending a request for the motion-related data of the first source-motion object.

In some embodiments, said receiving the motion-related data from the first source-motion object via the server comprises: receiving the motion-related data in a text-based format from the server.

In some embodiments, said receiving the motion-related data from the first source-motion object via the server comprises: receiving the motion-related data from a first channel on the server. In some embodiments, the one or more processors are further adapted for: sending a request for available source-motion objects; receiving a list of the available source-motion objects, said list of the available source-motion objects comprising the first source-motion object; selecting the first source-motion object from the list of the available source-motion objects; if the target-motion device is connected to a second channel of a second source-motion object, disconnecting the target-motion device from the second channel; and connecting the target-motion device to the first channel on the server.

In some embodiments, the received motion-related data is organized in a hierarchical structure having a plurality of topics.

In some embodiments, the one or more processors are further adapted for scaling at least a portion of the received motion-related data.

In some embodiments, the one or more processors are further adapted for adjusting a coordinate system of at least a portion of the processed motion-related data for adapting to the target-motion device.

In some embodiments, the one or more processors are further adapted for: receiving the audio/visual data associated with the first source-motion object; and presenting the audio/visual data.

In some embodiments, the one or more processors are further adapted for temporally synchronizing, on the target-motion device, the audio/visual data with the received motion-related data.

In some embodiments, the received motion-related data represents the motion of the first source-motion object in x, y, and z planes.

In some embodiments, the received motion-related data comprises at least one of a linear velocity, an acceleration, a vibration, thermal data, an altitude, gyroscopic data, and battery voltage.

In some embodiments, the first source-motion object is one of a vehicle movable on the ground, a vehicle movable on or in water, a vehicle movable in the air, and a vehicle movable in the space.

In some embodiments, the first source-motion object is one of a race car, an emergency vehicle, and a training vehicle.

In some embodiments, the actuator component comprises a set of one or more actuators coupled a user compartment; and said, for each unit of the processed motion-related data, controlling the actuator component based on the unit of the processed motion-related data for causing the motion of the at least portion of the target-motion device comprises: for each unit of the processed motion-related data, controlling the one or more actuators based on the unit of the processed motion-related data for moving the user compartment.

In some embodiments, the motion-related data comprising data captured by a sensor on a controlling component of the first source-motion object representing a motion event associated with the controlling component.

In some embodiments, the controlling component is at least one of a steering wheel, accelerator pedal, brake pedal, and a joystick.

In some embodiments, the one or more processors are further adapted for transmitting one or more instructions to the server for controlling the first source-motion object. According to one aspect of this disclosure, there is provided a system for controlling a target-motion device based on motion of a first source-motion object. The system comprises: the first source-motion object having one or more sensors; the target-motion device; and one or more servers coupled to the first source-motion object and the target-motion device via a network. The first source-motion object is adapted for: capturing motion-related data of the first source-motion object using the one or more sensors thereof, the motion-related data representing the motion of the first source-motion object, processing the motion-related data by converting captured motion-related data from a first format to a second format, and transmitting the processed motion-related data to a server. The server is adapted for forwarding the processed motion-related data to the target-motion device. The target-motion device is adapted for moving at least a portion thereof based on at least the processed motion-related data.

BRIEF DESCRIPTION OF THE DRAWINGS

The present invention is illustrated by way of example and not limitation in the figures of the accompanying drawings in which like references indicate similar elements.

FIGS. 1A to 1C are schematic diagrams showing the structure of a motion-mapping system according to one embodiment of this disclosure, wherein FIG. 1A shows that the system comprises a plurality of target-motion devices receiving motion events from a plurality of source-motion objects for mapping the motions of source-motion objects on the target-motion devices, wherein FIG. 1B shows functions of a source-motion object thereof, and wherein FIG. 1C shows functions of a target-motion object thereof;

DETAILED DESCRIPTION

Figure 1A:
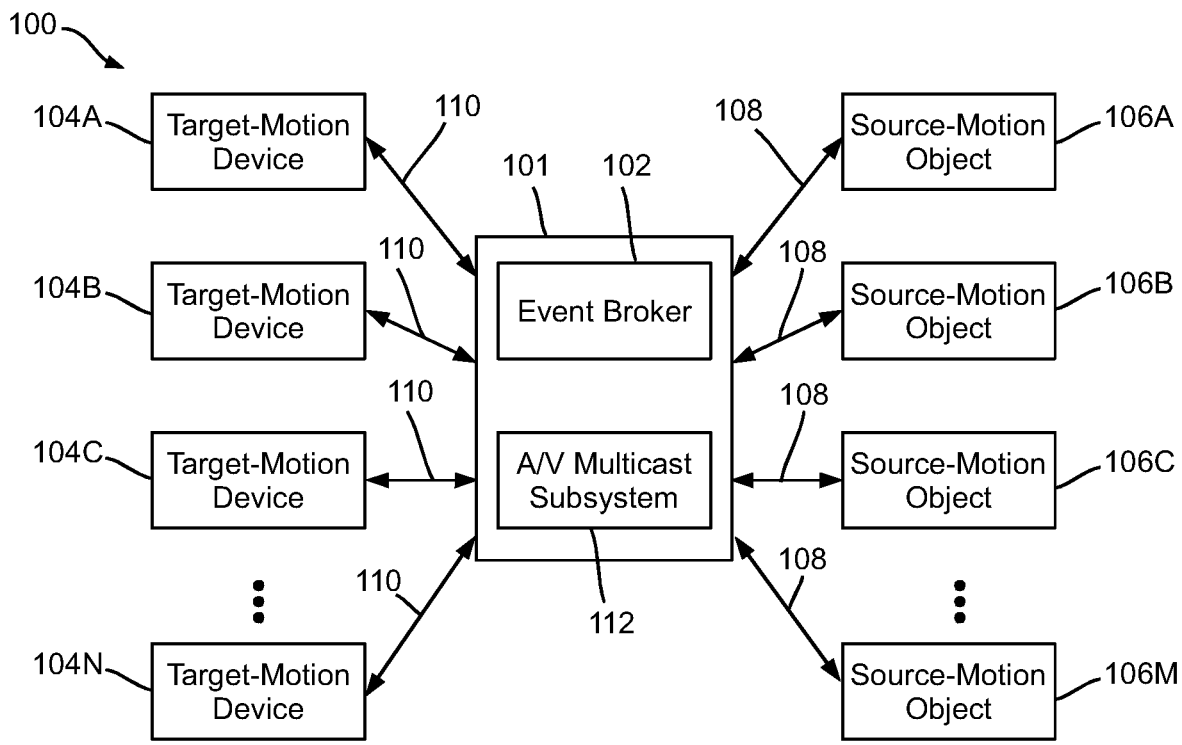

Embodiments disclosed herein relate to systems and methods for mapping motion-related parameters of one or more source-motion objects in motion events for replaying the motion events thereof on one or more target motion devices located remote from the one or more source-motion objects.

In some embodiments, the source-motion object may be a source-motion device such as a vehicle movable on the ground (e.g., a race car, a regular car, a truck, a van, a tractor, or the like), on or in water (e.g., a boat, a ship, a submergible vessel, or the like, movable on or in sea, lake, river, pond, and/or the like), in the air (e.g., an aircraft, a drone, or the like), or in the space (e.g., a spaceship).

In some other embodiments, the source-motion object may be an animal or livestock (such as a horse, a cow, a whale, or the like), a human (such as an athlete, a skier, a walker, a kayaker, a runner, or the like), or the like, moving at a remote location.

In various embodiments, the source-motion object (e.g., the vehicle, animal or livestock, human, or the like) may comprise, attach, equip with, or otherwise couple to, a plurality of sensors for collecting motion-related parameters thereof.

A motion event of the source-motion object is an event representing the motion of the source-motion object at a time instant. For example, a motion event may be a vector of acceleration such as a linear acceleration resulting from an engine or thrust that pushes the source-motion object forward, a breaking motion resulting from a break or opposite thrust that pushes the source-motion object in an opposite direction, an external force caused by, e.g., a bump, crash, and/or the like, that changes the motion of the source-motion object, and/or other types of forces applied to the source-motion object.

A motion event may comprise data describing and/or characterizing the source-motion object, such as motion-related parameters about the source-motion object environment or operation (e.g., data of surrounding objects, gyroscopic data, temperature, altimeter, battery, location, and/or the like) that relate to the motion of the source-motion object. Such motion-related parameters may be transmitted to the target-motion device in real-time.

For ease of description, the term "motion event" may also refer to the motion-related parameters, depending on the context.

The target-motion device may be a device such as a simulator suitable for replaying the motion of the source-motion object and may comprise a user compartment (e.g., a seat for a user to sit, a standing area for the user to stand, a cockpit, and/or the like) coupled to a set of action components such as one or more actuators, speakers, and/or displays. A control circuitry such as a processor controls the action components for replaying or simulating the motion events of a source-motion object. The target-motion device is adapted to receive motion-related parameters of a source-motion object and use the action components for mapping the received motion-related parameters of the source-motion object for replaying the motion thereof. For example, in some embodiments, the target-motion device is adapted to receive motion-related parameters of a source-motion object and use the action components for performing one or more physical motion corresponding to the motion events of the source-motion object.

In some embodiments, the target-motion device is adapted to receive motion-related parameters of a source-motion object and use the action components for simulating the motion events of the source-motion object. Therefore, a user of the target-motion device may gain same or similar experience of motion with the source-motion object as if the user is in the source-motion object. In these embodiments, the source-motion object may be controlled by a drive therein or may be automatically or autonomously controlled by a controller. The user of the target-motion device may not have control of the source-motion object.

In some other embodiments, the source-motion object is a remotely controllable motion device. The target-motion device is adapted to receive motion-related parameters of a source-motion object and use the action components for replaying the motion events of the source-motion object. The target-motion device may also provide a set of control components such as a steering wheel, a break, a gas pedal, and/or the like with sensors thereon to detect the action or driving effort of the user of the target-motion device and sends instructions to the source-motion object based on the detected user action for remotely control the target-motion device so as to provide the user of the target-motion device the driving experience as if the user is in the target-motion device.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" or "in some embodiments" in various places in the specification do not necessarily all refer to the same embodiment(s).

In the following description and claims, the terms "coupled" and "connected," along with their derivatives, may be used. It should be understood that these terms are not intended as synonyms for each other. The term "coupled" is used to indicate that two or more elements which may or may not be in direct physical or electrical contact with each other, co-operate or interact with each other. The term "connected" is used to indicate the establishment of communication between two or more elements coupled with each other.

The processes depicted in the figures that follow, are performed by processing logic that comprises hardware (e.g., circuitry, dedicated logic, and/or the like), software (such as that run or executed on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

According to one aspect of this disclosure, a method and system for capturing and transmitting motion-related data from a source-motion object to a target-motion device is described. In one embodiment, a set of source-motion objects are adapted to capture motion events that are published and subscribed by a set of target-motion devices. In this embodiment, a source-motion object is a type of vehicle comprising one or more sensors such as one or more gyroscopes, accelerometers, inertial measurement units (IMUs), thermometers, barometers, altimeters, indoor and/or outdoor positioning devices, e.g., Global Positioning System (GPS) devices, odometers, battery monitors, and/or the like for recording the motion of the source-motion object, where the motion of source-motion object is represented by a stream of motion events. The one or more sensors may also comprise one or more imaging devices (e.g., cameras) and/or microphones for recording audio/video (A/V) clips related to the motion of the source-motion object.

In one embodiment, the source-motion object transforms the motion events (or more specifically the motion-related parameters of the motion events) into a format that can be published by a broker such as a server maintaining one or more data channels with each data channel being used by a respective source-motion object for publication. A target-motion device may subscribe to different topics of a particular channel in the broker.

In this embodiment, each source-motion object publishes the transformed motion events on a respective channel of the broker. The broker receives the transformed motion events and sends each of the transformed motion events to a respective target-motion device that subscribes to the motion events of the source-motion object (or equivalently, the corresponding channel of the broker).

In one embodiment, the target-motion device is a device that may replay the motion of the source-motion object. In this embodiment, the target-motion device may comprise a user compartment coupled to a set of action components such as one or more actuators, speakers/headphones, and/or video monitors or displays. The target-motion device may also comprise a control circuitry such as a processor for receiving motion events of the source-motion object, processing the received motion events, and controls the action components based on the processed motion events for simulating the motion events of the source-motion object.

The action components such as the actuators then causes one or more physical motions of the target-motion device, e.g., to move the user compartment based on each of the processed motion events. The target-motion device also use the display and speakers/headphones to replay the A/V clips obtained from the source-motion object. In one embodiment, the target-motion device synchronizes the A/V clips with the received motion events.

For example and in one embodiment, a source-motion object may be a race car speeding along a raceway, turning, breaking, getting bumped by other race cars, and experiencing road vibrations or other bumps along the way. The race car may comprise a set of sensors for recording the motions (or more specifically, the motion-related data) thereof and create a stream of motion events. The race car may further transform each of the motion events into a stream of transformed motion events for publishing on a channel of the broker.

In this example, the target-motion device may comprise a user seat coupled to one or more processors and a set of actuators (e.g., a race-car cockpit simulator or a seat at a race track). The target-motion device may further comprise a set of video monitors and/or speakers or headphones for replaying the A/V clips obtained from the source-motion object.

The target-motion device may subscribe to the motion events and associated A/V clips of the race car, where the target-motion device processes the motion events to move the user compartment and presents the synchronized A/V clips. Thus, a user sitting in the user compartment of the target-motion device can experience of motion of the race car including the "road feel" and the synchronized audio and/or video thereof.

In another example and embodiment, the source-motion object may be off-road vehicle or construction vehicle with the sensors mounted thereon. The source-motion object transmits the motion events to a simulator at a remote location in which an operator may remotely control the vehicle while sensing the angle and motion of the vehicle (e.g., to get a sense for whether the vehicle is at risk of tipping over and/or other types of a motion feel) as if the operator is in the source-motion object.

In a further example, additional sensors may be used on a source-motion object (e.g., a race car, airplane, or another type of vehicles) for detecting and transmitting movement of the vehicle's steering wheel and/or pedals (or other types of controlling components) to a remote target-motion device, which would then move a simulated steering wheel, and/or pedals to reflect the movement of such items in the source-motion object.

In a further example, the source-motion object may be a remote controlled vehicle (e.g., a car, a truck, a drone, a boat (e.g., a sea-based boat, a lake-based boat, a river-based boat, or the like), or another type of remote controlled vehicle), where an operator may sit or otherwise stay in the target-motion device and feel the motion of the remotely controlled vehicle.

In one embodiment, the system may be deployed in a family entertainment center (e.g., a theme park, a fun park, an arcade, a race track, and/or the like) for entertaining guests, In another embodiment, the system may be used for other tasks such as remote inspection of rural, remote, and/or hazardous environments (e.g., well pads, pipelines, and/or the like), search and rescue (wherein the target-motion device may be used as a base station for sensors and other assets (e.g., drones)), delivery of suitable items or goods (e.g., emergency gear, medicines, packages, etc.), and/or the like.

For example, in one embodiment, the remote control of large assets in a hazardous area may be remotely controlling of a bulldozer or other large equipment in a hazardous or remote mine site, hauling trucks/trailers in a defined operational site or area, boats after natural disaster where human operators are evacuated, large drones for delivery of goods/services where roads are impassable, visual inspections or monitoring of flare stacks, power plants, and/or transmission lines.

In another embodiment, the target-motion device may be used for competitive e-Racing leagues, wherein gamers use the target-motion devices to control source-motion objects for racing. In yet another embodiment, the system may be used in agriculture areas.

In one embodiment, the combination of motion events and audio/video clips is part of a remote operation or "ride along" experience. Although remotely operated assets are known in the art, they usually lack safety and operational awareness offered by motion or haptic feedback.

FIG. 1A is a schematic diagram showing a motion-mapping system 100 in one embodiment. The system 100 comprises one or more target-motion devices 104A to 104N (collectively identified using reference numeral 104) in communication with one or more source-motion objects 106A to 106M (collectively identified using reference numeral 106) via a server 101 having an event broker 102 and an audio/video (AAT) multicast subsystem 112 through a network (not shown). The server 101 creates and maintains one or more channels for the one or more source-motion objects 106A to 106M. As will be described in more detailed below, each source-motion objects 106 sends its data stream 108 to the respective channel of the server 101. The server 101 may process the data streams 108 for generating output data streams 110. A target-motion device 104 may subscribe to a channel of the broker 102 or different topics of the channel for receiving the data stream 110 thereof for replay.

Figure 1B:
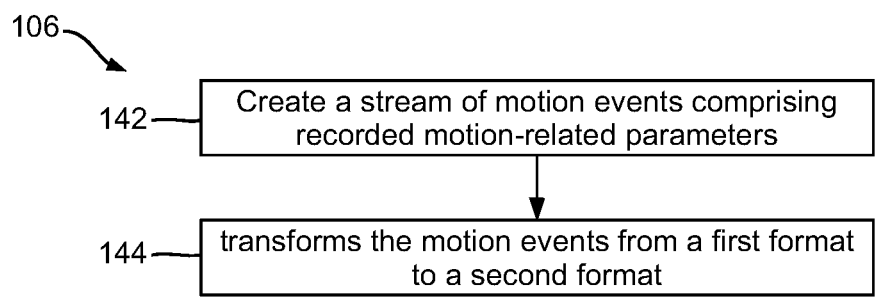

Each source-motion object 106 comprises one or more sensors coupled or attached to various locations thereof such as the dashboard, floor pan, or the like for detecting various motions of the source-motion object 106, recording motion-related parameters thereof, and creating a stream of motion events comprising the recorded motion-related parameters (see function 142 of FIG. 1B). Each source-motion object 106 may also record A/V feed or clips corresponding to the stream of motion events.

Each source-motion object 106 then sends the stream of motion events and the A/V clips to the respective channel of the server 101 (i.e., the stream of motion events and the A/V clips of each source-motion object 106 is associated with the respective channel in the server 101 wherein the stream of motion events is published to the event broker 102 and the A/V clips are sent to the A/V multicast subsystem 112 thereof. In this embodiment, each source-motion object 106 transforms its recorded motion events into a format suitable for publishing to the event broker 102.

Figure 1C:
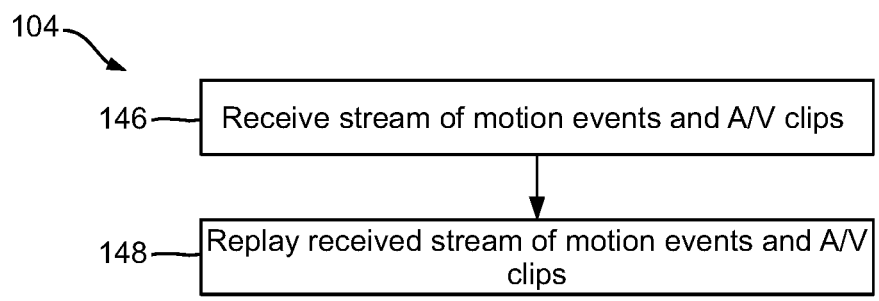

Each target-motion device 104 may subscribe to a channel of the server 101 for receiving the corresponding stream of motion events and the A/V clips recorded by the source-motion object associated with the channel (see function 146 of FIG. 1C) and replaying the received stream of motion events and the A/V clips in some fashion (see function 148 of FIG. 1C), such that the user sitting in or otherwise coupled to the target-motion device 104A-N may receive tactile feedback on the motion from the source-motion object 106, and experience the feeling of what it's like to be in that race car.

The stream of transform motion events may be generated and replayed in real time or near real time, in a delayed time, on-demand, and/or from a stored object (e.g., a stored file).

Herein, the terms "real time" and "near real time" refer to the scenario wherein no delay is intentionally introduced between the generation of the motion events at the source-motion object and the replay at the target-motion device and the delay therebetween is generally caused due to the limited speed of processing and communication of the motion events which depends on the speed and ability of the source-motion object 106 to generate and transmit the motion events, the network system to communicate the motion events, and the target-motion device 104 to process the received motion events. Such delay usually is negligible. For example, in one embodiment, in a real-time or near real-time scenario, the delay between the generation of the motion events at the source-motion object 106 and the replay thereof at the target-motion device 104 is on the order of tens to hundreds of milliseconds.

For example and in one embodiment, the source-motion object 106 may be a race car that is speeding along the raceway, turning, breaking, getting bumped by other race cars, and feeling road vibrations or other bumps along the way. The race car includes a set of sensors that records these different kinds of motions. The race car further transforms each of the motion events into a stream of transformed motion events that may be published on a channel in the event broker 102. The event broker 102 provides this stream of transformed motion events to various target source devices 104A-N that subscribe to this stream of transformed motion events.

As described above and in one embodiment, each of the source-motion objects 106 transforms the motion events thereof before transmitting these motion events to the event broker 102. In this embodiment, a source-motion object 106 converts a motion event in a native format output by the sensor(s) into a format suitable for publishing to the broker 102 (see function 144 of FIG. 1B). In one embodiment, the source-motion object 106 transforms a motion event in a binary format output from the sensor(s) thereof to a text-based format for publishing to the broker 102. For example and in one embodiment, the source-motion objects 106 comprises a BNO055 sensor offered by Bosch Sensortec GmbH of Reutlingen, GERMANY, which is a 9-axis Absolute Orientation Sensor having a triaxial 14-bit accelerometer, a triaxial 16-bit gyroscope, and a triaxial geomagnetic sensor, and outputs motion events formatted in a proprietary binary format. In this embodiment, the BNO055 sensor comprises a library to receive the motion events and digitize the detected analog motion data of a source-motion object 106 into a digitized motion event. In other embodiments, the source-motion object 106 comprises a different type of sensor, multiple sensors, and/or multiple types of sensors.

In any of these embodiments, the source-motion object 106 receives each motion event and converts the motion event into a text-based or text-formatted tuple. For example, the X, Y, and Z motions of each motion event are converted into the text-based tuple for publishing to the event broker 102. In one embodiment, the text-based tuple comprises a timestamp. In one embodiment, the text-based tuple has the format of (timestamp, X motion, Y motion, Z motion) with each parameter thereof taking integer values.

As another example and in one embodiment, if a source-motion object 106 is moved in response to an external force (e.g., a bump by another vehicle, a crash, bump from the road, etc.), the source-motion object 106 records the motion caused by the external force and transforms this motion into a text-based tuple. The source-motion object 106 sends this text-based tuple to the event broker 102.

For example and in one embodiment, Table 1 below shows an example of the X, Y, Z values.

TABLE 1

Example of X, Y, Z motion values.

| time | X_value | Y_value | Z_value |
|---|---|---|---|
| Started: | Nov 09 2018 | 13:03:00:809 | |
| 0 | 0 | 0 | 0 |
| 0.05 | −0.35026 | 0.10676 | −0.12066 |
| 0.05 | −0.50313 | −0.0003 | −0.06899 |
| 0.05 | −0.54627 | −0.18193 | −0.0365 |
| 0.05 | −0.45679 | −0.28366 | 0.02368 |
| 0.05 | −0.31244 | −0.19844 | 0.07801 |
| 0.0501 | −0.19314 | −0.04664 | 0.08813 |
| 0.1122 | −0.09673 | 0.09558 | 0.07695 |
| 0.1122 | −0.02855 | 0.19837 | 0.06949 |
| 0.1122 | −0.00778 | 0.25803 | 0.07322 |
| 0.1122 | −0.04613 | 0.2543 | 0.07641 |
| 0.1122 | −0.13188 | 0.18133 | 0.07428 |
| 0.1122 | −0.23362 | 0.09664 | 0.07002 |
| 0.1796 | −0.30872 | 0.05989 | 0.04818 |
| 0.1797 | −0.34014 | 0.05403 | 0.03008 |
| 0.1797 | −0.32097 | 0.08279 | 0.01356 |
| 0.1797 | −0.24054 | 0.10942 | 0.01143 |

In Table 1, the source-motion object 106 processes these values into text-based tuples of motion events and send them to the broker 102. In a further embodiment, the source-motion object may generate other types of motion events. For example, the source-motion object 106 may generate motion events for heading, roll, pitch, system calibration, acceleration calibration, and magnetic calibration. Below is an example for a text-based tuple for this type of information. In one embodiment, each of the tuples include a timestamp:

Heading=0.00 Roll=0.00 Pitch=0.00 Sys_cal=0 Gyro_cal=0 Accel_cal=0 Mag_cal=0

Heading=0.06 Roll=−0.88 Pitch=−1.12 Sys_cal=0 Gyro_cal=3 Accel_cal=0 Mag_cal=0

Heading=0.06 Roll=−0.88 Pitch=−1.12 Sys_cal=0 Gyro_cal=3 Accel_cal=0 Mag_cal=0

Heading=1.19 Roll=31.44 Pitch=−2.69 Sys_cal=0 Gyro_cal=3 Accel_cal=0 Mag_cal=0

Heading=1.44 Roll=30.31 Pitch=−4.88 Sys_cal=0 Gyro_cal=3 Accel_cal=0 Mag_cal=0

Heading=1.31 Roll=29.50 Pitch=−3.19 Sys_cal=0 Gyro_cal=3 Accel_cal=1 Mag_cal=0

Heading=1.56 Roll=29.50 Pitch=−2.88 Sys_cal=0 Gyro_cal=3 Accel_cal=1 Mag_cal=0

Heading=1.88 Roll=29.62 Pitch=−3.06 Sys_cal=0 Gyro_cal=3 Accel_cal=1 Mag_cal=0

Heading=0.88 Roll=−17.75 Pitch=−5.00 Sys_cal=0 Gyro_cal=3 Accel_cal=1 Mag_cal=0

In one embodiment, each source-motion object 106 continuously transforms the motion events recorded by the sensor thereon and publishes these transformed motion events (e.g., the text-based tuples) to the respective channel in the event broker 102. In one embodiment, the data of the transformed motion events (e.g., the text-based tuples) may be organized in a hierarchical structure for efficiency of subscription for the target-motion devices. For example, a channel in the event broker 102 may be "mycar" and may comprise a plurality of topics organized in a tree structure such as "telemetry," "telemetry/accel," telemetry/accel/X," telemetry/accel/Y," telemetry/accel/Z", and/or the like. A target-motion device 104A-N can subscribe to different topics of a particular channel of the broker 102.

The event broker 102 receives the different streams of motion events from source-motion objects 106A to 106M, where each of the motion-event streams are published on different channels maintained by the event broker 102. In one embodiment, the event broker 102 is a Message Queueing Telemetry Transport (MQTT) broker, where a MQTT broker is a server that communicates with clients (e.g., target-motion devices 104A to 104N and source-motion object 106A to 106M) using the MQTT protocol. In this embodiment, the MQTT broker organizes the motion events as a hierarchy of topics, where these topics can be one or more subscription channels (e.g., "mycar/telemetry/accel/X", "mycar/telemetry/accel/Y", "mycar/telemetry/accel/Z", etc.). Such a hierarchic structure of topics facilitates the system to efficiently organize the motion events and facilitates the user to efficiently look for and search for the motion events of a desired topic or category.

When a source-motion object 106 has a motion event to publish, this source-motion object 106 sends a control message including the text-based tuple to the MQTT broker 102, where the MQTT broker 102 distributes the motion event to one or more target-motion devices that subscribe to the channel corresponding to this source-motion object 106. In one embodiment, if there are no target-motion devices 104 that subscribe to this channel, then the motion event is dropped. In an alternative embodiment, the event broker 102 stores the received motion event for playback in the future. In a further embodiment, the event broker 102 may be a different type of event broker.

In an alternative embodiment, each or the source-motion objects 106A to 106M may transmit an A/V feed along with the motion events. In one embodiment, the A/V feed may be transmitted via the A/V multicast subsystem 112 of the server 101 to one or more target-motion devices 104 that subscribe the corresponding channel (e.g., the source-motion object 104 transmits the A/V feed to the A/V multicast subsystem 112, where the target-motion device 106 joins the A/V feed). The A/V multicast subsystem 112 may be any suitable system that controls a multicasting of the A/V feed for any one of the source-motion objects 106A to 106M.

In this embodiment, the target-motion device 104 synchronizes the motion events received from the event broker 102 with the A/V feed received from the corresponding source-motion object 106. For example and in one embodiment, the target-motion device 104N subscribes to the motion events of the source-motion object 106M (e.g., the target-motion device is a seat including actuators that can replay the motion events). The target-motion device 104N sends a connect message for the subscription channel corresponding to the motion feed of the source-motion object 106M. The event broker 102 sends the motion events from the source-motion object 106M to the target-motion device 104N. In addition, the target-motion device 104N sends a join message for the A/V corresponding to the source-motion object 106M to the A/V multicast system 112. The target-motion device 104N synchronizes the A/V feed with the received motion events, so as to synchronously replay the motion events and the A/V feed.

In one embodiment, the target-motion device 106 is a device that replays the motion events for a user. In this embodiment, the target-motion device may include one or more processors coupled to a set of movable actuators for replaying a motion event for a user in or near a user compartment (e.g., a seat). In one embodiment, the one or more processors process each received motion event and send the processed motioned event to the set of actuators via an actuator interface. The set of actuators receive the processed motion event and move the user compartment based on the processed motion event. For example and in one embodiment, the target-motion device 104 may replay a series of motion events that represent a motion of the corresponding source-motion object 106 (e.g., normal motion, acceleration, deceleration, a bump, crash, change in altitude, and/or the like).

In a further embodiment, the target-motion device 106 may process each of the received motion events. In this embodiment, the target-motion device 104 may scale one or more motion-related parameters of each of the motion events based on a setting. For example and in one embodiment, the target-motion device 104 may reduce or enhance the magnitude of the motion events. The scaling may be a constant amount (e.g., increasing or decreasing by a certain percentage, such as 10%), a variable amount (greater scaling for smaller or larger changes in motion), a threshold (scaling by a certain amount when greater or less than a threshold), and/or the like. In one embodiment, the scaling is based on a user profile. For example and in one embodiment, scaling for a small child may be greater than scaling for an adult. Alternatively, there may be a universal scaling in addition to any customized scaling. In this example, there may be a scaling to a motion event representing a crash into a barrier at excessive force.

In another embodiment, the target-motion device 104 may re-orient the motion event or change the coordinate system thereof. In this embodiment, the target-motion device 104 may change the X, Y, and/or Z-axis of the motion event so the processed motion event corresponds to the user compartment. For example and in embodiment, the sensors on the recording source-motion object may have a positive Z-axis pointing towards the ground, whereas the target-motion device 104 may have a positive Z-axis pointing away from the ground. In this example, the target-motion device 104 changes the Z-values of the received motion events to adapt to its own Z-axis orientation. Alternatively, the target-motion device may swap pairs of the motion-event values based on a reorientation between the source and target-motion devices.

Those skilled in the art will appreciate that the target-motion device 104 does not need to accurately reproduce the motion event of the source-motion object 106. In various embodiments, the target-motion device 104 may modify the motion-related parameters of the source-motion object 106 to adapt to the characteristics of the target-motion device 104. For example, in some embodiments, the target-motion device 104 may not be movable from one location to another (however, it may be movable in a vibrating manner along one or more predefined directions) and may not reproduce any location-movement of the source-motion object 106. In these embodiments, the target-motion device 104 may simulate acceleration/deceleration by applying a pressure to the user thereof along a suitable direction (e.g., applying a pressure to the back or chest of the user for simulating acceleration or deceleration, respectively).

In some embodiments, the target-motion device 104 may be movable from one location to another. However, the movement of the target-motion device 104 may be a scaled-down or reduced version of that of the source-motion object 106.

Figure 2A:
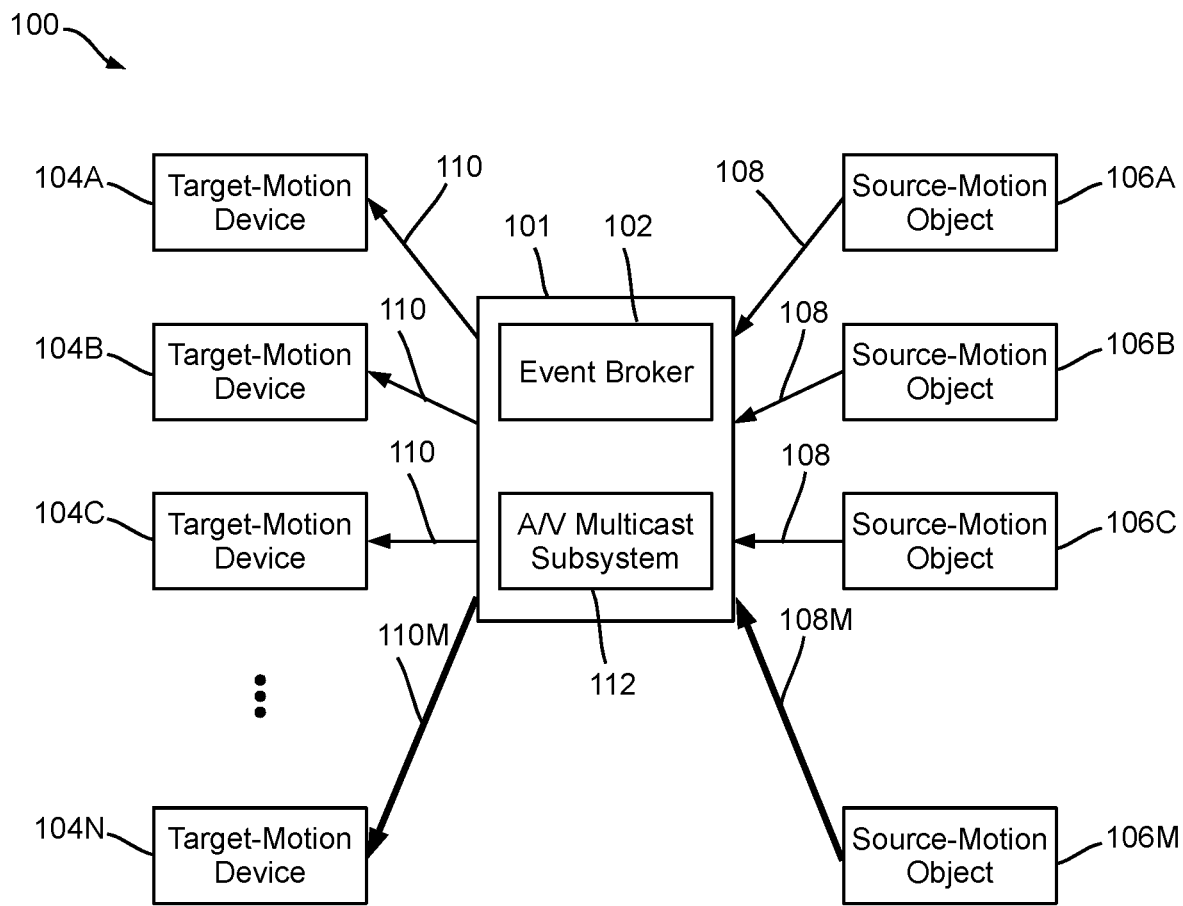
FIGS. 2A and 2B show an example of the system shown in FIG. 1 wherein a target-motion device changes source-motion objects.
Figure 2B:
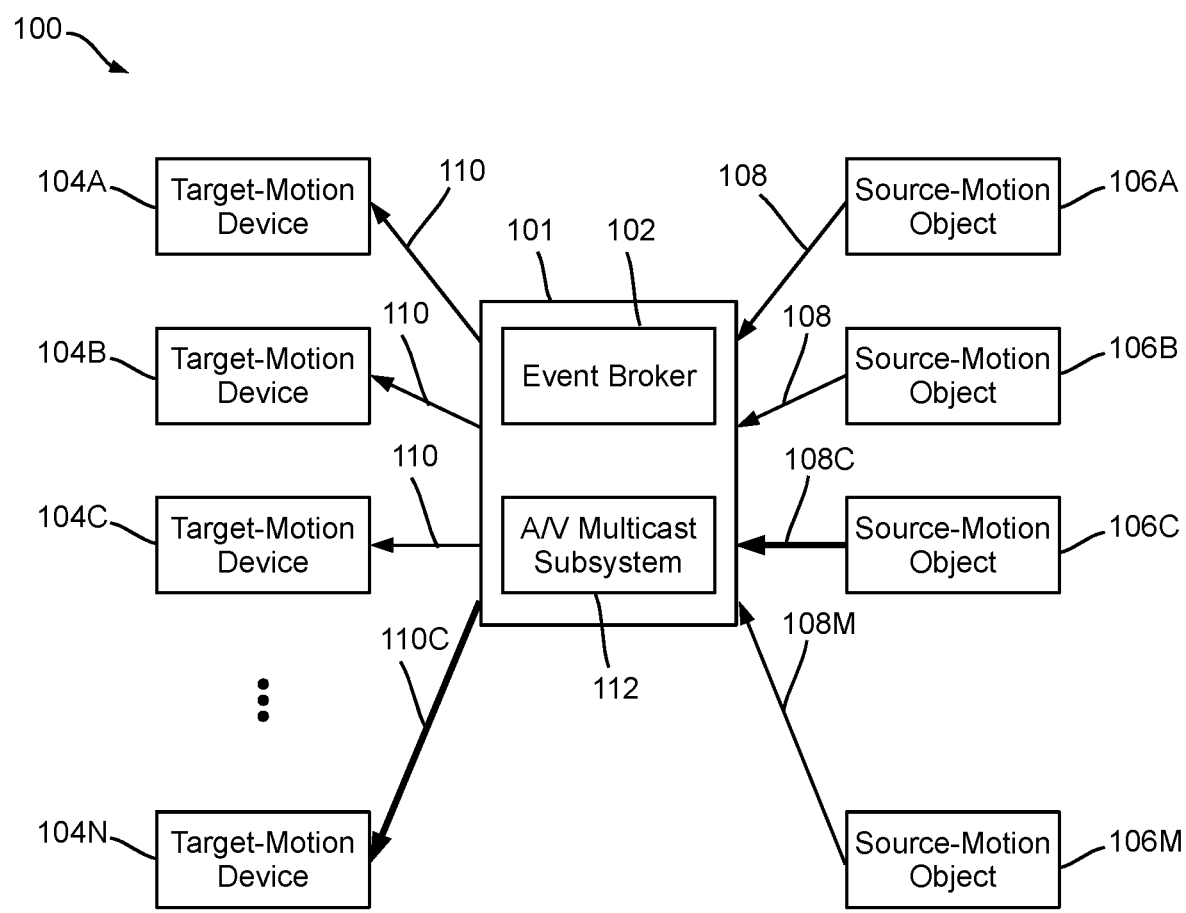

A target-motion device 104 may change its subscription from a first channel to a second channel. FIGS. 2A and 2B show an example. As shown in FIG. 2A, the target-motion device 104N subscribes (represented using thick arrows) the channel associated with the source-motion object 106M (e.g., a race car). Thus, the source-motion object 106M sends the data stream 108 of its motion events to the server 101 with the motion events sent to the event broker 102 and A/V feed or clips are sent to the A/V multicast subsystem 112. The event broker 102 and/or the A/V multicast subsystem 112 and the A/V multicast subsystem 112 may process the motion events and A/V feed or clips, respectively for generating an output data stream 110M which is then sent to the target-motion device 104N for replay.

As shown in FIG. 2B, the target-motion device 104N changes its channel subscription from the channel of the source-motion object 106M to that of the source-motion object 106C (e.g., another race car in the same race) by sending to the event broker 102 a disconnect message for the channel of the source-motion object 106N and a connect message for the channel of the source-motion object. These messages indicate that the target-motion device 106N is unsubscribing to the channel (or corresponding topics thereof) of the source-motion object 104M and subscribing to the channel (or corresponding topics thereof) of the source-motion object 106C.

In addition, the target-motion device 106N sends a leave message for the A/V feed of the source-motion object 106M and a join message for the A/V feed of the source-motion object 106C. These messages indicate that the target-motion device 106N is leaving the A/V feed of the source-motion object 104N and joining the A/V feed of the source-motion object 106C.

Alternatively, the target-motion device 104N may change subscription channels from one type of source-motion object (e.g. a race car) to another type of source-motion object (e.g., a race truck at another event, an airborne vehicle, a seaborne vehicle, and/or the like). In this embodiment, after changing the subscription channel, the target-motion device 104N begins receiving the motion events and/or A/V feeds from the newly subscribed source-motion object 106C. The target-motion device 104M begins to replay the motion events of the source-motion object 106C.

Figure 3:
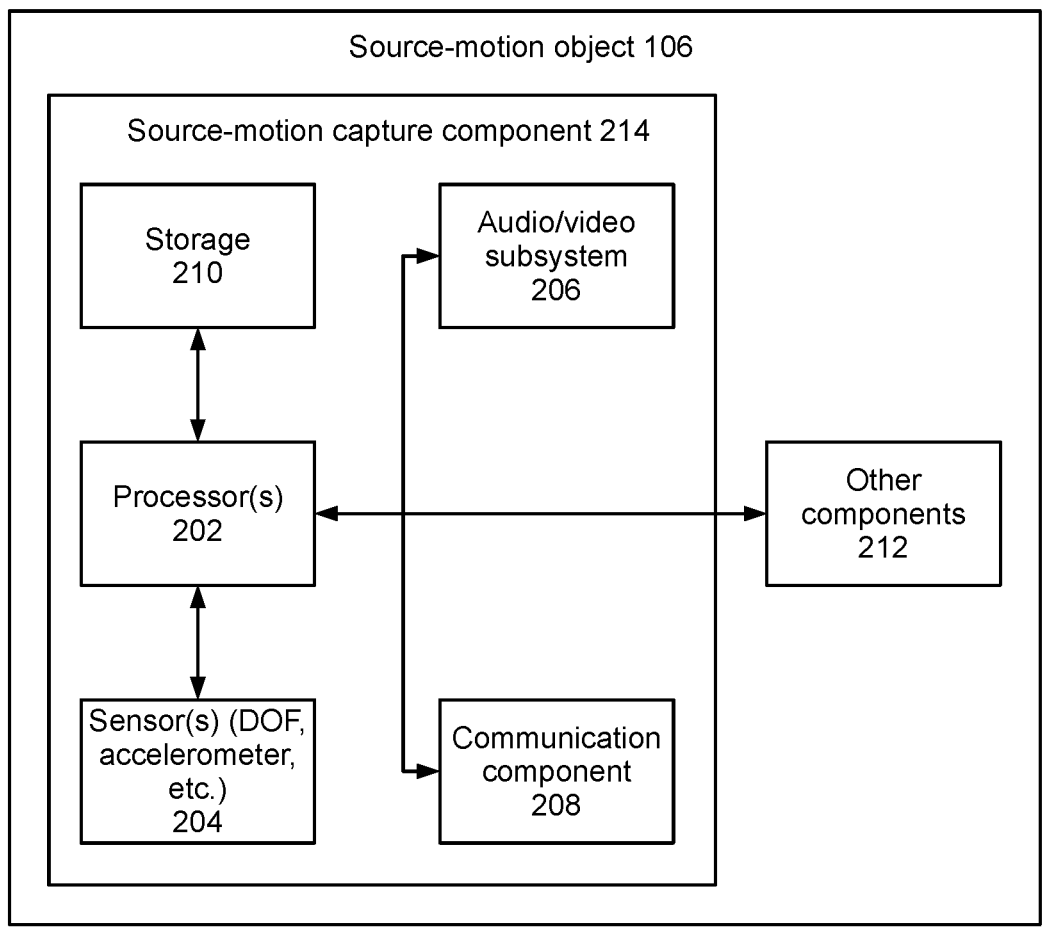
FIG. 3 is a schematic diagram of a source-motion object of the system shown in FIG. 1, according to one embodiment of this disclosure.

FIG. 3 is a block diagram of one embodiment of the source-motion object 106, or more precisely, a sensor subsystem integrated with, coupled to, attached to, or otherwise comprised in the source-motion object 106 for collecting motion-related parameters. For ease of description, the sensor subsystem shown in FIG. 3 is simply denoted as the source-motion object 106. In FIG. 3, the source-motion object 106 comprises a source-motion capture component 214 and other components 212. The source-motion capture component 214 comprises a storage 210, one or more processors 202, one or more sensors 204, an A/V subsystem 206, and a communications component 208. The one or more processors 202 may be one or more processor units (e.g., central processing unit, processing core, and/or the like) suitable for processing and transforming the motion events generated by the one or more sensors 204.

For example, the one or more processors may be one or more single-core or multiple-core computing processors such as INTEL® microprocessors (INTEL is a registered trademark of Intel Corp., Santa Clara, Calif., USA), AMD® microprocessors (AMD is a registered trademark of Advanced Micro Devices Inc., Sunnyvale, Calif., USA), ARM® microprocessors (ARM is a registered trademark of Arm Ltd., Cambridge, UK) manufactured by a variety of manufactures such as Qualcomm of San Diego, Calif., USA, under the ARM® architecture, or the like.

The one or more processors may also be a real-time processor, a programmable logic controller (PLC), a microcontroller unit (MCU), a μ-controller (UC), a specialized/customized process/controller using e.g., field-programmable gate array (FPGA) or application-specific integrated circuit (ASIC) technologies, and/or the like.

The one or more sensors 204 may comprise one or more sensors suitable for to detect and record environmental data. In this embodiment, the sensors may comprise sensors to record degrees of freedom (DOF) of motion, acceleration, deceleration, temperature, altimeter, battery, location, and/or any other type of data describing the environments and/or operation of the source-motion object 106. For example, the one or more sensors 204 may comprise an above-described BNO055 sensor.

The audio/video subsystem 206, in one embodiment, is used to record audio and/or video clips corresponding to the source-motion object 106. In one embodiment, the audio/video subsystem 206 may comprise one or more imaging devices such as cameras, one or more microphones, and/or another type of audio/video recording devices, a processor, a storage, and/or other suitable components for facilitating capturing audio and/or video of the source-motion object 106 and digitizing the captured audio and/or video for transmission to the A/V multicast subsystem 112. The video may comprise video clips captured from inside the source-motion object 106 and/or video clips captured from a perspective associated with the source-motion object 106. The captured audio may be audio of an operator of the source-motion object 106 and/or may be audio related to the operation of the source-motion object 106 (e.g., engine noise, road and/or environmental noise, and/or other audio).

The storage 210 may be any type of storage used to store data generated by the source-motion object 106. The storage 210 may comprise a plurality of memory units accessible by the one or more processors 202 and for reading and/or storing instructions for the one or more processors 202 to execute, and for reading and/or storing data, including input data and data generated by the one or more processors 202. The storage 210 may be volatile and/or non-volatile, non-removable or removable memory such as random-access memory (RAM), ready-only memory (ROM), electrically erasable programmable read-only memory (EEPROM), solid-state memory, hard disks, CD, DVD, flash memory, or the like. In use, the storage 210 is generally divided to a plurality of portions for different use purposes. For example, a portion of the storage 210 (denoted as storage memory herein) may be used for long-term data storing, for example, for storing files or databases. Another portion of the storage 210 may be used as the system memory for storing data during processing (denoted as working memory herein).

Although not shown in FIG. 3, the source-motion capture component 214 may optionally include a battery such as a lithium polymer (LiPo) battery as a power source therefor, a voltage controller, on/off trigger, and/or an enclosure for the source-motion capture component 214.

The communications component 208 is a component for communicating data with other devices via a suitable wireless or wired communications technology such as the long term evolution (LTE) wireless technology, 3G, 4G and/or 5G wireless mobile telecommunications technologies, WI-FI® (WI-FI is a registered trademark of Wi-Fi Alliance, Austin, Tex., USA), WiMAX® (is a registered trademark of WiMAX Forum, Clackamas Oreg., USA), BLUETOOTH® (BLUETOOTH is a registered trademark of Bluetooth Sig Inc., Kirkland, Wash., USA), ZIGBEE® (ZIGBEE is a registered trademark of ZigBee Alliance Corp., San Ramon, Calif., USA), Ethernet, and/or the like. In some embodiments, parallel ports, serial ports, USB connections, optical connections, or the like may also be used for connecting other computing devices or networks although they are usually considered as input/output interfaces for connecting input/output devices.

As shown in FIG. 3, the source-motion object 106 may also comprise one or more other components 212. In one embodiment, the other components 212 may comprise components for driving or propelling the source-motion object 106 (e.g., propulsion components, such as an engine, wheels, wing, propeller, and/or another type of propulsion component), components for housing the source-motion object 106, and/or other suitable types of components. Examples of a source-motion object 106 may be, but not limited to, a vehicle (e.g., a race car, an emergency vehicle, an airborne vehicle, a seaborne vehicle, an outer-space vehicle, and/or the like), a training device, and/or the like.

Figure 4:
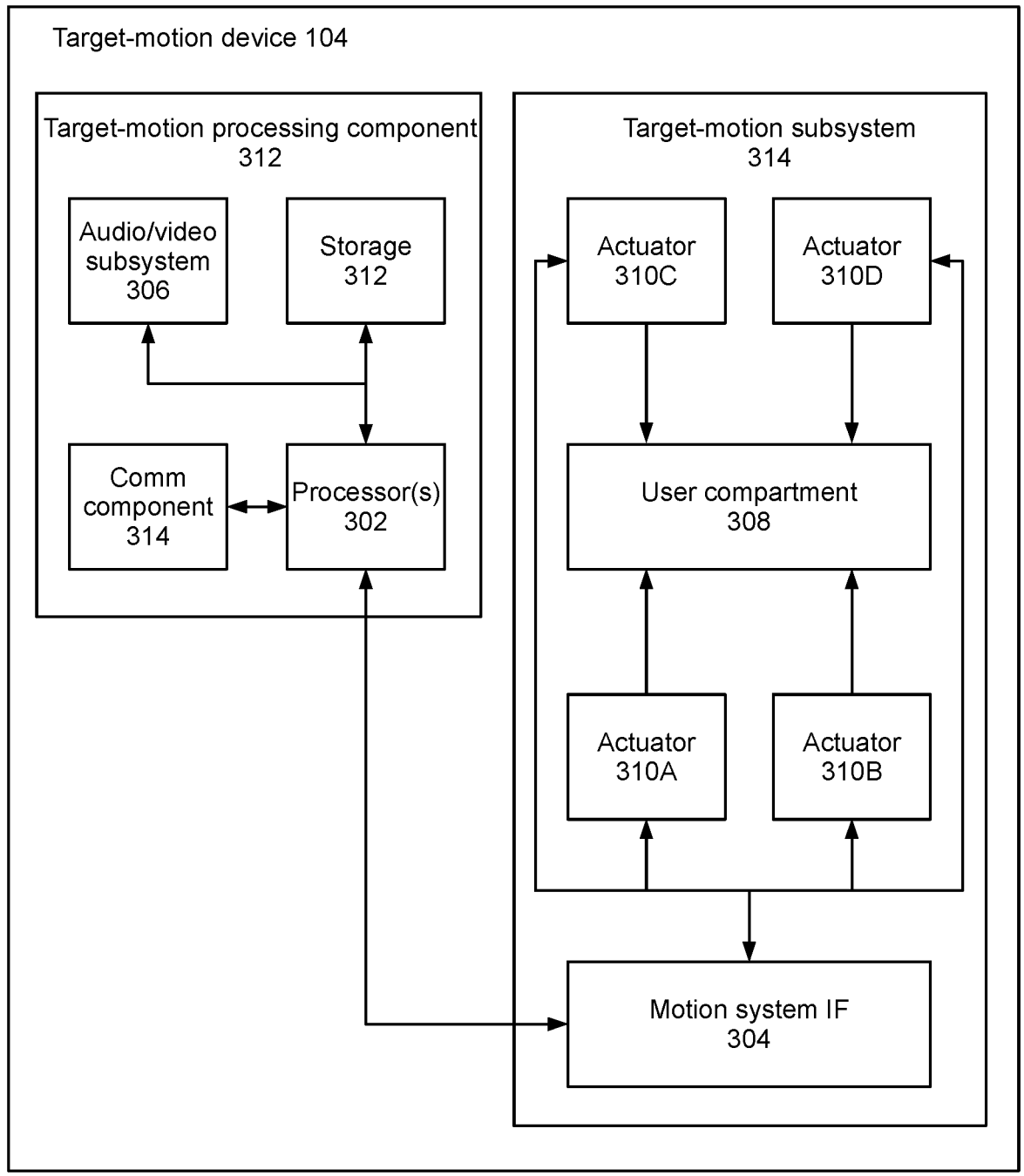
FIG. 4 is a schematic diagram of a target-motion device of the system shown in FIG. 1, according to one embodiment of this disclosure.

FIG. 4 is a block diagram of the target-motion device 104, according to one embodiment of this disclosure. In FIG. 4, the target-motion device 104 comprises a target-motion processing component 312 and a target-motion subsystem 314, where the target-motion processing component 312 is the component for processing the received motion events and/or audio/video feed, and the target-motion subsystem 314 is a subsystem comprising a component that responds to the motion events.

In one embodiment, the target-motion processing component 312 comprises one or more processors 302, an audio/video subsystem 306, a storage 312, and a communications component 314. In this embodiment, the target-motion subsystem 314 comprises a motion system interface 304, a user compartment 308, and actuators 310A to 310D (collectively identified using reference numeral 310). In one embodiment, the one or more processors 302 can be one or more above-described processor units for processing and transforming the motion events received by the target-motion device 104. The storage 312 that is any suitable type of above-described storage for storing data generated and/or received by the target-motion device 104. The audio/video subsystem 306, in one embodiment, is used to present the received A/V feed of the corresponding source-motion object 106. In this embodiment, the audio/video subsystem 306 may comprise one or more displays or monitors for displaying the video data, one or more speakers or headphones for presenting the audio data, and/or other components for processing and presenting the A/V feed. The communications component 314 is a component for communicating data with other devices using any suitable wireless or wired communication technologies as described above.

The target-motion subsystem 314 comprises a motion system interface 304. In one embodiment, the motion system interface 304 is an interface to the set of actuators 310. In this embodiment, the one or more processors 302 may send processed motion events to the motion system interface 304, where the motion system interface 304 receives the processed motion events, transforms each processed motion event into a set of commands for each of the actuators 310A to 310D, and sends the individual commands thereto.

The actuators 310A to 310D receive the commands and act according to the received command thereby causing the overall motion of the user compartment 308. In one embodiment, each of the actuators 310A to 310D is a component of machine responsible for moving the user compartment 308. While in the embodiment shown in FIG. 4, the target-motion subsystem 314 comprises four actuators 310A to 310D, in some alternate embodiments, the target-motion subsystem 314 may comprise more or less actuators (e.g., 2 to 5 actuators). In one embodiment, the actuators 310A to 310D may have a size of 1.5" (i.e., 1.5 inches), 3", 6", or other suitable sizes. The user compartment 308 is a component for accommodating a user. For example and in one embodiment, the user compartment 308 may comprise one or more seats for user to sit and/or other components for user to use or operate. In one embodiment, the user compartment 308 is the component for moving the user according to the received motion events in real-time, near real-time, at a delayed time, on demand, or based on stored motion events. The user compartment 308 may also be used in theater style seating where the motion of each seat is synchronized with the audio/video feed in the theater. The system 100 thus may be used to leverage in motion seats in a theater with a simple software push. In one embodiment, flight chairs may be used as part of a target-motion device 104, where each flight chair comprises a flight stick, throttle, and/or pedals for input to the remotely operated source-motion objects 106. In turn, the flight chair may move in respond to the motion of the remotely operated source-motion objects 106. In one embodiment, the flight chair may be coupled to a set of actuators to replay the motion events received by the target-motion device in real-time.

In one embodiment, the target-motion device may synchronize the playback of the A/V data with the replaying of the motion events. In this embodiment, each frame of the A/V data and each motion event comprise a timestamp for synchronizing the A/V playback and the motion event replaying. For example and in one embodiment, the target-motion device may use ticks (e.g., idle time-periods) to add time-spaces between the motion events to align the motion events with the A/V data frames.

Figure 5:
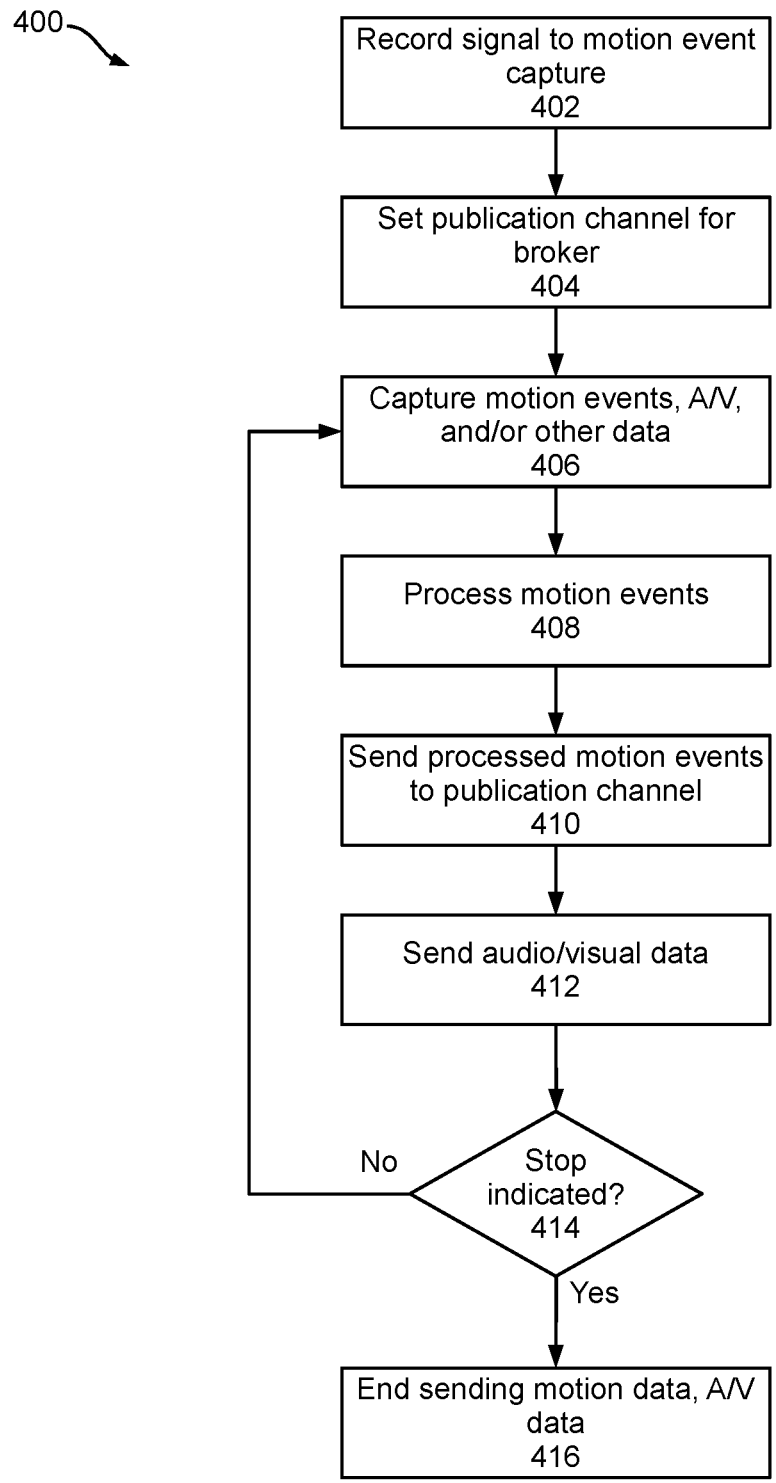
FIG. 5 is a flowchart showing a process executed by the system shown in FIG. 1 for capturing and processing motion events, according to one embodiment of this disclosure.

As described above, each source-motion object may capture and process motion events that characterize the motion and/or operation thereof. FIG. 5 is a flowchart showing a process 400 for capturing and processing motion events, according to one embodiment of this disclosure. As shown, the process 400 begins by receiving the signal to start the motion-event capture (step 402). In one embodiment, the signal to start the motion-event capture may be a signal automatically generated when the source-motion object starts, a signal automatically generated when the motion-event capture mechanism of the source-motion object 106 is started, a signal automatically generated by the event broker 102, a signal generated when the user of the source-motion object 106 presses a button, a signal generated when the user of the target-motion device 104 presses a button, and/or the like. At step 404, the server 101 sets up or creates the publication channels on the broker 102. In one embodiment, the server 101 sets up the publication channels based on a configuration for each source-motion object 106.

At step 406, the system 100 captures the motion events of the source-motion object 106, an A/V feed associated therewith, and/or other data. In one embodiment, the system 100 captures the motion events using a set of one or more sensors on the source-motion object 106 as described in FIG. 1 above.

At step 408, the system 100 processes the motion events. As described above, the motion events may be processed by creating text-based tuples. At step 410, the processed motion events are sent to the publication channel of the event broker 102 in the server 101 corresponded to the source-motion object 106. At step 412, the audio/visual data captured at the source-motion object 106 is sent to the A/V multicast subsystem 112 which then forward the audio/video data to one or more requesting target-motion devices.

At step 414, the system 100 determines if stop has been indicated. If no stop is indicated, the process 400 loops back to step 408. If a stop has been indicated (e.g., vehicle has been turned off, a controller indicated a stop, and/or the like), the system 100 stops sending the motion events and A/V data and the process 400 is terminated.

Figure 6:
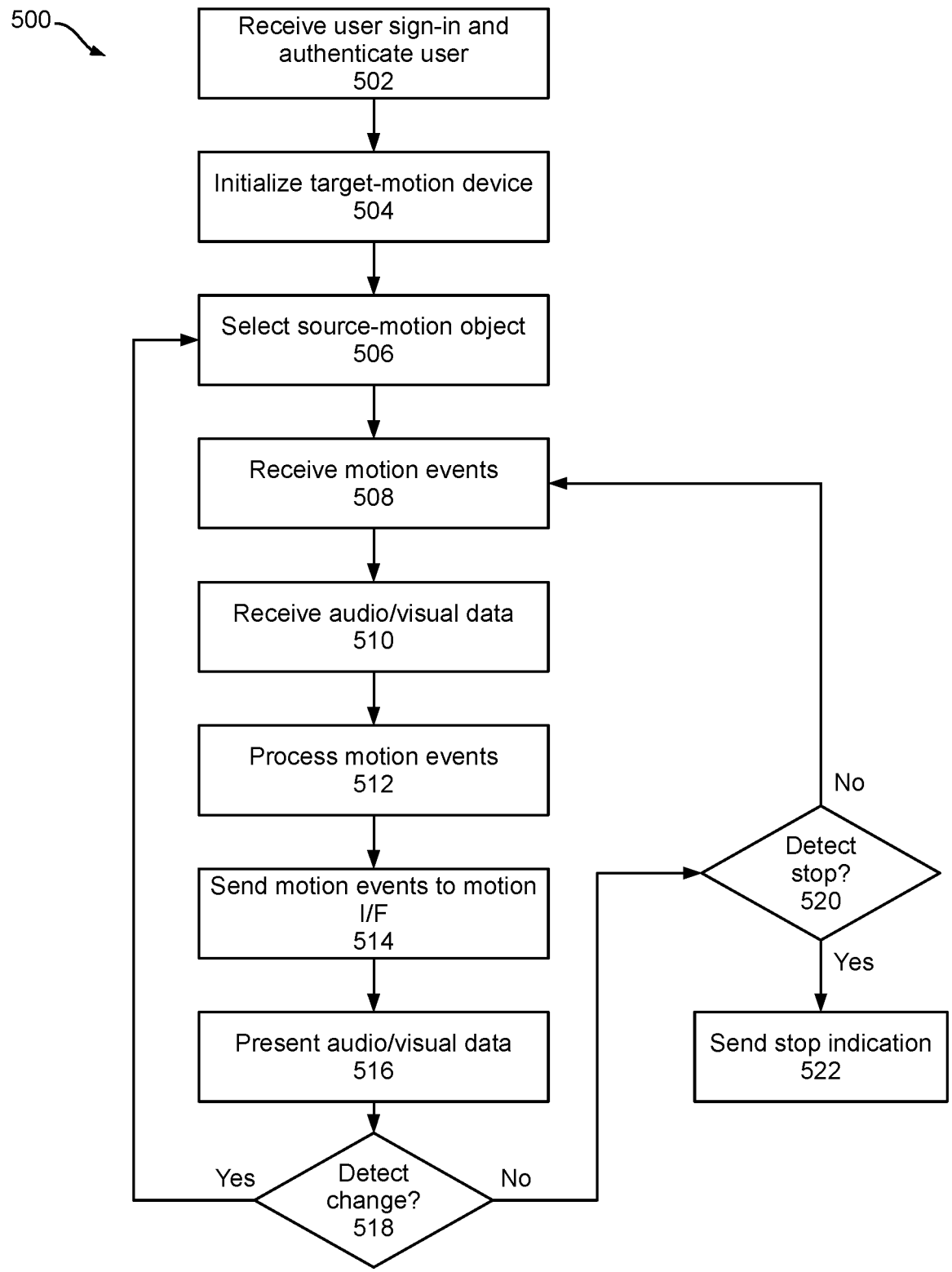
FIG. 6 is a flowchart showing a process for capturing and processing motion events, according to another embodiment of this disclosure.

As described above, the target-motion device 104 may request motion data and/or an associated A/V feed. FIG. 6 is a flowchart showing a process 500 for capturing and processing motion events, according to one embodiment of this disclosure. As shown, the process 500 begins by receiving a user sign on and authenticating the user. After the user authentication, the user is associated with the profile for the target-motion device 104 (step 502). For example and in one embodiment, the user profile may be used to set a scaling factor for the target-motion device 104 used by the user.

At step 504, the system 100 initializes the target-motion device 104. At step 506, the system 100 selects a source-motion object 106. In one embodiment, the system 100 presents a range of available source-motion objects 106 to a user of a target-motion device 104 and the user may select one of the available source-motion objects 106. At step 508, the event broker 102 receives the motion events from the selected source-motion object 106 and assigns the received motion events to a publication channel associated with the selected source-motion object 106. At step 510, the A/V multicast subsystem 112 receives the A/V data from the selected source-motion object 106 and assigns the received A/V data to the publication channel associated with the selected source-motion object 106.

At step 512, the event broker 100 processes the motion events. In one embodiment, the event broker 100 processes the motion events by adding a scaling factor and/or reorienting the motion events as described above. The event broker 100 then sends the processed motion events to the motion interface of the target-motion device 104 (step 514).

In one embodiment, the motion interface of the target-motion device 104 receives the processed motion events and causes the set of actuators 310 to move which in turn move a user compartment 308. At step 516, target-motion device 104 presents the A/V data. In one embodiment, the target-motion device 104 may synchronize the playback of the A/V data with the replaying of the motion events. In this embodiment, each frame of the A/V data and each motion event includes a timestamp that can be used to synchronize the A/V playback and the motion event replaying. For example and in one embodiment, the target-motion device 104 may use ticks to add time-spaces between the motion events to align the motion events with the A/V data frames.

At step 518, the system 100 determines if the target-motion device 104 changes to a different source-motion object 106. In one embodiment, the user may select a different source-motion object. For example and in one embodiment, the target-motion device 104 selects a new source-motion object in the same events as the previous source-motion object. Alternatively, the target-motion device 104 may change subscription channels from one type of source-motion object (e.g., a race car) to another type of source emotion device (e.g., a race truck at another event, an airborne vehicle, a seaborne vehicle, and/or another type of source-motion object). If there is a change of the source-motion object 106, the process 500 loops back to step 506. If there is not a change of the source-motion object 106, the system 100 determines if there is a stop indicated. If there is not an indicated stop, the process 500 loops back to step 508. If there is a stop, the system 100 sends a stop indication to the event broker 102 and the A/V multicast subsystem 112, and the process 500 is terminated.

Figure 7:
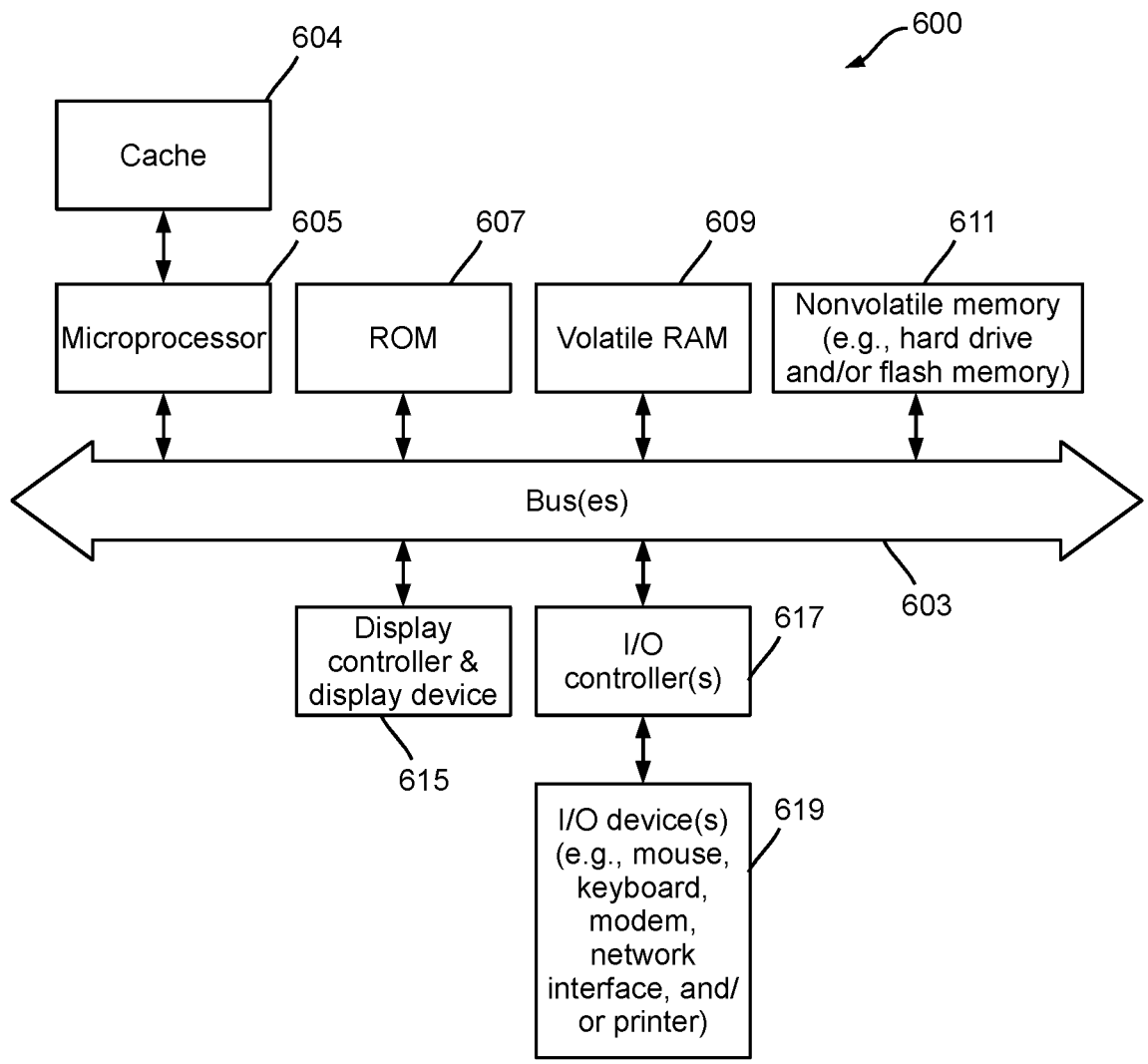
FIG. 7 is a schematic diagram of one example of a data processing subsystem used in the system, according to one embodiment of this disclosure.

FIG. 7 shows one example of a data processing subsystem 600 which may be used in the system 100 according to one embodiment of this disclosure. For example, the subsystem 600 may be implemented as a source-motion object or target-motion device that includes the subsystem 600, such as the source-motion object 106 shown in FIG. 3 or the target-motion device 104 shown in FIG. 4. Note that while FIG. 7 illustrates various components of a data processing subsystem 600, it is not intended to represent any particular architecture or manner of interconnecting the components as such details are not germane to the present disclosure. It will also be appreciated that network computers and other data processing systems or other consumer electronic devices, which have fewer components or perhaps more components, may also be used as the data processing subsystem 600.

As shown in FIG. 7, the data processing subsystem 600 is the form of a computer system and comprises one or more buses 603 coupled to one or more microprocessors 605, a ROM 607, a volatile RAM 609, and a non-volatile memory 611, a display controller 615, and one or more input/output (I/O) controllers 617.

The microprocessor 605 may include one or more CPU(s), GPU(s), a specialized processor, and/or a combination thereof. The microprocessor 605 may retrieve the instructions from the memories 607, 609, and 611 and execute the instructions to perform operations as described above. The display controller 615 is coupled to a display device. The one or more I/O controllers 617 are coupled to one or more to peripheral input/output devices 619 such as computer mice, keyboards, modems, network interfaces, printers, and/or the like The volatile RAM 609 is typically implemented as dynamic RAM (DRAM) which requires power continually in order to refresh or maintain the data in the memory.

The nonvolatile memory 611 may be one or more mass storages such as a hard drive or a magnetic optical drive, an optical drive, a DVD RAM, a flash memory, or other suitable types of memory subsystems which maintain data (e.g. a large amount of data) even after power is removed from the data processing subsystem 600. Typically, the nonvolatile memory 611 may be a random access memory although this is not required. While FIG. 7 shows that the nonvolatile memory 611 is a local device coupled directly to the rest of the components in the data processing subsystem 600, it will be appreciated that the system 100 may utilize a non-volatile memory which is remote from the data processing subsystem 600, such as a network storage device which is coupled to the data processing system 600 through a network interface such as a modem, an Ethernet interface, or a wireless network. The bus 603 may include one or more buses connected to each other through various bridges, controllers, and/or adapters as is known in the art.

In above embodiments, the target-motion device 104 comprises one or more actuators for moving the target-motion device. In some alternative embodiments, the target-motion device 104 may also comprise one or more actuators for applying pressures to the user thereof based on the processed motion-related data obtained from the source-motion object 106.

In some of above embodiments, the target-motion device 104 may change the subscription from a currently subscribed source-motion object to a different source-motion object. In one embodiment, the source-motion object 106 may be operated by a driver therein, by a controller (i.e., automatically or autonomously driving), or by a remote user other than the user of the target-motion device 104. In this embodiment, the change of the subscription of the source-motion object 106 may occur at any time as the user of the target-motion device 104 desires.

In another embodiment, the currently subscribed source-motion object is a source-motion object remotely controlled by the user of the target-motion device 104. In this embodiment, the change of the subscription of the source-motion object 106 may occur only when the currently subscribed source-motion object is in a static or parking status.

In yet another embodiment, the currently subscribed source-motion object is a source-motion object automatically or autonomously drivable by a controller, and is currently remotely controlled by the user of the target-motion device 104. In this embodiment, the change of the subscription of the source-motion object 106 may occur when the controller determines that the currently subscribed source-motion object can be safely switched to the automatic or autonomous driving model.

In some of above embodiments, the scaling of at least a portion of the motion-related data is conducted by the target-motion device 104. In some embodiments, the scaling of at least a portion of the motion-related data may be conducted by the event broker 102 of the server 101.

In some of above embodiments, when a target-motion device 104 requests for subscribing a first source-motion object, the event broker 102 checks if the target-motion device 104 is connected to a channel of a second source-motion object. If yes, the event broker 102 disconnects the target-motion device 104 from the channel of the second source-motion object and connects the target-motion device 104 to the channel of the first source-motion object.

In some embodiments, when the target-motion device 104 checks if the target-motion device 104 is connected to a channel of a second source-motion object. If yes, the target-motion device 104 disconnects itself from the channel of the second source-motion object and connects itself to the channel of the first source-motion object.

Portions of what was described above may be implemented with logic circuitry such as a dedicated logic circuit or with a microcontroller or other form of processing core that executes program code instructions. Thus, the processes disclosed above may be performed with program code such as machine-executable instructions that cause a machine to execute these instructions and perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, and/or the like), and/or electronic circuitry disposed on a semiconductor chip (e.g., "logic circuitry" implemented with transistors) designed to execute instructions such as a general-purpose processor and/or a special-purpose processor. The processes disclosed above may also be performed by (in the alternative to a machine or in combination with a machine) electronic circuitry designed to perform the processes (or a portion thereof) without the execution of program code.

The present disclosure also relates to an apparatus for performing the operations described herein. This apparatus may be specially constructed for the required purpose, or it may comprise a general-purpose computer selectively activated or reconfigured by a computer program stored in the computer. Such a computer program may be stored in a computer-readable storage medium, such as but is not limited to, any type of disk including floppy disks, optical disks, CD-ROMs, magnetic-optical disks, ROMs, RAMs, EPROMs, EEPROMs, magnetic or optical cards, or any type of media suitable for storing electronic instructions, and each coupled to a computer system bus.

A machine-readable medium comprises any suitable mechanism for storing or transmitting information in a form readable by a machine (e.g., a computer). For example, a machine-readable medium may comprise ROM, RAM, magnetic disk storage media, optical storage media, flash memory devices, and/or the like.

An article of manufacture may be used to store program code. An article of manufacture that stores program code may be embodied as, but is not limited to, one or more memories (e.g., one or more flash memories, RAMs (static, dynamic or other)), optical disks, CD-ROMs, DVD ROMs, EPROMs, EEPROMs, magnetic or optical cards, or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data-processing arts to most effectively convey the substance of their work to others skilled in the art. An algorithm is herein, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "capturing," "processing," "transmitting," "selecting," "assigning," "distributing," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

Although embodiments have been described above with reference to the accompanying drawings, those of skill in the art will appreciate that variations and modifications may be made without departing from the scope thereof as defined by the appended claims.

What is claimed is:

1. A computerized method for controlling a target-motion device based on motion of a first source-motion object, the method comprising:
   capturing, using one or more sensors, a stream of motion events of the first source-motion object comprising motion-related data thereof, the stream of motion events and the motion-related data representing the motion of the first source-motion object;
   processing, by one or more processors of the first source-motion object, the motion-related data by converting captured motion-related data from a first format to a second format;
   transmitting, by the first source-motion object, the processed motion-related data to a first channel of a plurality of channels on a server;
   forwarding, by the server, the processed motion-related data to the target-motion device that subscribes the first channel; and
   replaying, by the target-motion device, the stream of motion events based on at least the processed motion-related data.

2. The computerized method of claim 1, wherein said processing, by the one or more processors of the first source-motion object, the motion-related data comprises:
   processing, by the one or more processors of the first source-motion object, the motion-related data by converting captured motion-related data from a first format to a text-based format for publishing on the server.

3. The computerized method of claim 1 further comprising:
   receiving, by the server, a request from the target-motion device for subscribing the first channel;
   if the target-motion device is connected to a second channel of the plurality of channels associated with a second source-motion object, disconnecting, by the server, the target-motion device from the second channel; and
   connecting, by the server, the target-motion device to the first channel.

4. The computerized method of claim 1 further comprising:
   organizing, by the server, the processed motion-related data in a hierarchical structure having a plurality of topics.

5. The computerized method of claim 1 further comprising:
   scaling, by the target-motion device, at least a portion of the processed motion-related data.

6. The computerized method of claim 1 further comprising:
   adjusting, by the target-motion device, a coordinate system of at least a portion of the processed motion-related data for adapting to the target-motion device.

7. The computerized method of claim 1 further comprising:
   capturing, using the one or more sensors, audio/video data related to the first source-motion object;
   transmitting, by the first source-motion object, the audio/visual data to the target- motion device via the server;
   presenting, by the server, the audio/visual data on the target-motion device; and temporally synchronizing, by the target-motion device, the audio/visual data with the processed motion-related data.

8. The computerized method of claim 1, wherein the motion-related data comprises at least one of a linear velocity, an acceleration, a vibration, thermal data, an altitude, gyroscopic data, and battery voltage.

9. The computerized method of claim 1, wherein said transmitting, by the first source-motion object, the processed motion-related data to the server comprises:
    transmitting, by the first source-motion object, the processed motion-related data to the server using a Message Queueing Telemetry Transport protocol.

10. One or more non-transitory computer-readable storage devices comprising computer-executable instructions for controlling a target-motion device based on motion of a first source-motion object, wherein the instructions, when executed, cause a processing structure to perform actions comprising:
    capturing, using one or more sensors, a stream of motion events of the first source-motion object comprising motion-related data thereof, the stream of motion events and the motion-related data representing the motion of the first source-motion object;
    processing, by one or more processors of the first source-motion object, the motion-related data by converting captured motion-related data from a first format to a second format;
    transmitting, by the first source-motion object, the processed motion-related data to a first channel of a plurality of channels on a server;
    forwarding, by the server, the processed motion-related data to the target-motion device that subscribes the first channel; and
    replaying, by the target-motion device, the stream of motion events based on at least the processed motion-related data.

11. The one or more non-transitory computer-readable storage devices according to claim 10, wherein said processing, by the one or more processors of the first source-motion object, the motion-related data comprises:
    processing, by the one or more processors of the first source-motion object, the motion-related data by converting captured motion-related data from a first format to a text-based format for publishing on the server.

12. The one or more non-transitory computer-readable storage devices according to claim 10, wherein the instructions, when executed, cause the processing structure to perform further actions comprising:
    receiving, by the server, a request from the target-motion device for subscribing the first channel;
    if the target-motion device is connected to a second channel of the plurality of channels associated with a second source-motion object, disconnecting, by the server, the target-motion device from the second channel; and
    connecting, by the server, the target-motion device to the first channel.

13. The one or more non-transitory computer-readable storage devices according to claim 10, wherein the instructions, when executed, cause the processing structure to perform further actions comprising:
    organizing, by the server, the processed motion-related data in a hierarchical structure having a plurality of topics.

14. The one or more non-transitory computer-readable storage devices according to claim 10, wherein the instructions, when executed, cause the processing structure to perform further actions comprising:
    scaling, by the target-motion device, at least a portion of the processed motion-related data.

15. The one or more non-transitory computer-readable storage devices according to claim 10, wherein the instructions, when executed, cause the processing structure to perform further actions comprising:
    adjusting, by the target-motion device, a coordinate system of at least a portion of the processed motion-related data for adapting to the target-motion device.

16. The one or more non-transitory computer-readable storage devices according to claim 10, wherein the instructions, when executed, cause the processing structure to perform further actions comprising:
    capturing, using the one or more sensors, audio/video data related to the first source-motion object;
    transmitting, by the first source-motion object, the audio/visual data to the target-motion device via the server;
    presenting, by the server, the audio/visual data on the target-motion device; and
    temporally synchronizing, by the target-motion device, the audio/visual data with the processed motion-related data.

17. The one or more non-transitory computer-readable storage devices according to claim 10, wherein the motion-related data comprises at least one of a linear velocity, an acceleration, a vibration, thermal data, an altitude, gyroscopic data, and battery voltage.

18. The one or more non-transitory computer-readable storage devices according to claim 10, wherein said transmitting, by the first source-motion object, the processed motion-related data to the server comprises:
    transmitting, by the first source-motion object, the processed motion-related data to the server using a Message Queueing Telemetry Transport protocol.

19. A server for controlling a target-motion device based on motion of a first source-motion object, the server comprising:
    one or more communication components;
    one or more storage components; and
    one or more processors coupled to the one or more communication components and the one or more storage components for:
    receiving motion-related data of a stream of motion events from the first source-motion object via a network to a first channel of a plurality of channels of the server, the motion-related data representing the motion of the first source-motion object; and
    forwarding the processed motion-related data to the target-motion device for replaying the stream of motion events by the target-motion device based on at least the processed motion-related data.

20. The server of claim 19, wherein the motion-related data is in a text-based format converted from data captured by the first source-motion object.

* * * * *